United States Patent
Koshelev et al.

(10) Patent No.: US 11,604,352 B2
(45) Date of Patent: Mar. 14, 2023

(54) WAVEGUIDE-BASED PROJECTOR

(71) Applicant: Facebook Technologies, LLC, Menlo Park, CA (US)

(72) Inventors: Alexander Koshelev, Redmond, WA (US); Giuseppe Calafiore, Redmond, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 295 days.

(21) Appl. No.: 16/950,109

(22) Filed: Nov. 17, 2020

(65) Prior Publication Data
US 2022/0035159 A1    Feb. 3, 2022

Related U.S. Application Data

(60) Provisional application No. 63/058,240, filed on Jul. 29, 2020.

(51) Int. Cl.
*G02B 27/01* (2006.01)
*F21V 8/00* (2006.01)
(Continued)

(52) U.S. Cl.
CPC ......... *G02B 27/0172* (2013.01); *G02B 6/002* (2013.01); *G02B 6/2935* (2013.01);
(Continued)

(58) Field of Classification Search
CPC ............ G02B 27/0172; G02B 27/0922; G02B 27/0983; G02B 27/30; G02B 2027/0174; G02B 6/002; G02B 6/2935; G02B 6/3516
(Continued)

(56) References Cited

U.S. PATENT DOCUMENTS 7,283,706 B2    10/2007   Kim et al.
7,370,973 B2    5/2008    Sakaguchi et al.
(Continued)

FOREIGN PATENT DOCUMENTS

CN    206892507 U    1/2018
EP    2741121        11/2014
(Continued)

OTHER PUBLICATIONS

European Search Report for European Application No. 21183326.4, dated Dec. 14, 2021, 5 pages.
(Continued)

*Primary Examiner* — Collin X Beatty
(74) *Attorney, Agent, or Firm* — Pequignot + Myers; Matthew A. Pequignot

(57) ABSTRACT

A projector includes an illumination waveguide layer, a collimation waveguide layer, and a spatial modulator. The illumination waveguide layer expands a light beam which is coupled to the spatial modulator. The spatial modulator modulates the expanded light beam to provide a line of light points of controllable brightness. The collimation waveguide collimates light of the light points to obtain a fan of collimated light beams. Each collimated light beam of the fan has an angle corresponding to a coordinate of the corresponding light point of the line. A tiltable reflector may be placed at the exit pupil to scan the fan of light beams in a plane non-parallel to the plane of the fan, thus providing a 2D image in angular domain. An array of Mach-Zehnder interferometers may be used in place of the illumination waveguide layer and the spatial modulator to provide the line of light points.

20 Claims, 16 Drawing Sheets

(51) Int. Cl.
  *G02B 6/293* (2006.01)
  *G02B 6/35* (2006.01)
  *G02B 27/09* (2006.01)
  *G02B 27/30* (2006.01)

(52) U.S. Cl.
  CPC ....... *G02B 6/3516* (2013.01); *G02B 27/0922* (2013.01); *G02B 27/0983* (2013.01); *G02B 27/30* (2013.01); *G02B 2027/0174* (2013.01)

(58) Field of Classification Search
  USPC .......................................................... 359/13
  See application file for complete search history.

(56) References Cited

U.S. PATENT DOCUMENTS

| | | | |
|---|---|---|---|
| 7,386,206 B2 | 6/2008 | Tabuchi et al. | |
| 7,595,933 B2 | 9/2009 | Tang | |
| 8,002,450 B2 | 8/2011 | Van Ostrand et al. | |
| 9,400,395 B2 | 7/2016 | Travers et al. | |
| 9,411,210 B2 | 8/2016 | Sugiyama et al. | |
| 9,436,001 B2 | 9/2016 | Shiratsuchi et al. | |
| 9,933,587 B2 * | 4/2018 | Modavis | G02B 6/12004 |
| 9,959,818 B2 | 5/2018 | Bohn | |
| 10,241,328 B2 | 3/2019 | Urey et al. | |
| 10,810,917 B2 * | 10/2020 | Fattal | G02B 30/33 |
| 2007/0086703 A1 * | 4/2007 | Kirk | G02B 6/12007 |
| | | | 385/24 |
| 2011/0134017 A1 | 6/2011 | Burke | |
| 2017/0285348 A1 * | 10/2017 | Ayres | G02B 6/0055 |
| 2018/0003981 A1 | 1/2018 | Urey | |
| 2018/0088325 A1 | 3/2018 | Brown et al. | |
| 2018/0120563 A1 | 5/2018 | Kollin et al. | |
| 2019/0154811 A1 | 5/2019 | Kondo et al. | |
| 2020/0041712 A1 | 2/2020 | Peroz et al. | |
| 2020/0142184 A1 | 5/2020 | Sato et al. | |
| 2020/0292819 A1 * | 9/2020 | Danziger | G02B 27/0172 |

FOREIGN PATENT DOCUMENTS

| | | |
|---|---|---|
| WO | 2016105281 | 6/2016 |
| WO | 2016105283 | 6/2016 |
| WO | 2016142707 | 9/2016 |
| WO | 2007149898 | 12/2017 |
| WO | 2020110757 A1 | 6/2020 |

OTHER PUBLICATIONS

Ohno, Y.; Hardis, J.E. Four-Color Matrix Method for Correction of Tristimulus Colorimeters. In Color and Imaging, 5th ed.; Society for Imaging Science and Technology: Scottsdale, AZ, USA, 1997; pp. 301-305.

* cited by examiner

WAVEGUIDE-BASED PROJECTOR

REFERENCE TO RELATED APPLICATION

The present application claims priority form U.S. Provisional Patent Application No. 63/058,240, entitled "Ultra-Wide FOV Projector", filed on Jul. 29, 2020, and incorporated herein by reference in its entirety.

TECHNICAL FIELD

The present disclosure relates to waveguide-based optical devices, and in particular to collimators and projectors usable for displaying images, remote sensing, etc.

BACKGROUND

Visual displays are used to provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems are intended for individual users. Head mounted displays (HMD), near-eye displays (NED), and the like are being used increasingly for displaying content to the individual users. The content displayed by HMD/NED includes virtual reality (VR) content, augmented reality (AR) content, mixed reality (MR) content, etc. The displayed VR/AR/MR content can be three-dimensional (3D) to enhance the experience and, for AR/MR applications, to match virtual objects to real objects observed by the user.

Compact display devices are desired for head-mounted displays. Because a display of HMD or NED is usually worn on the head of a user, a large, bulky, unbalanced, and/or heavy display device would be cumbersome and may be uncomfortable for the user to wear. Compact display devices require compact light sources and image projectors.

BRIEF DESCRIPTION OF THE DRAWINGS

Exemplary embodiments will now be described in conjunction with the drawings, in which.

DETAILED DESCRIPTION

Figure 1A:
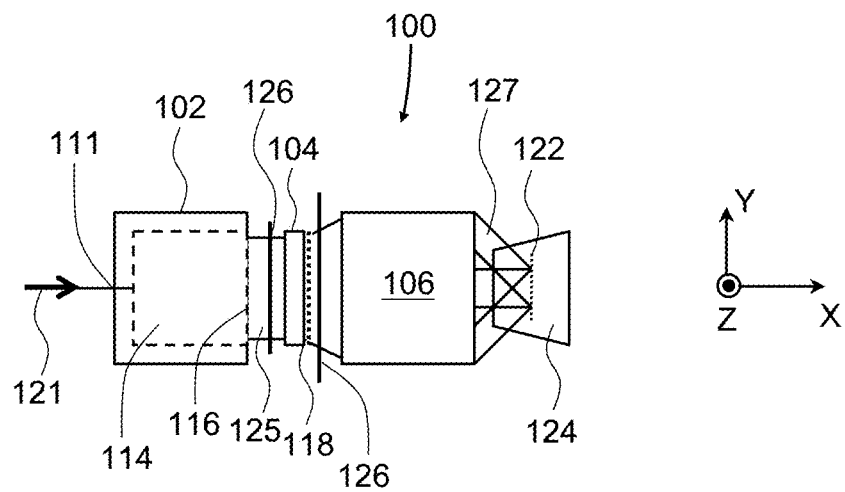
FIGS. 1A and 1B are plan and side schematic views, respectively, of a projector of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1A, 1B, 2A, 2B, 3A, 3B, FIGS. 4, 5, 6A, 6B, 7A, 7B, FIGS. 11-13, and FIG. 15, similar reference numerals denote similar elements.

Many types of displays, especially worn display systems, require a compact projector that renders an image in one or two dimensions. A light source may be used to provide a collimated light beam, and a spatial modulator may be disposed in an optical path of the collimated light beam to provide an image in linear domain. A one-dimensional (1D)

spatial modulator, that is, a modulator that spatially modulates the collimated light beam in one dimension (along one line) only, may be used to construct a 1D projector. A combination of such 1D projector with a scanning element, such as microelectromechanical system (MEMS) mirror or a dispersive element in combination with tunable wavelength light source, enables one to construct a 2D projector for display applications.

1D projector can be made much more compact than its 2D counterpart, even when using conventional free space cylindrical optics. For instance, a 10×10×10 mm projector would be too bulky to put in most mobile devices, while a 10×10×1 mm device, depending on its orientation, does not pose a significant problem for integration into a mobile device, for example. A 1D projector that fits inside a mobile device may have much fewer constraints on the attainable field of view (FOV), eyebox size, effective focal length (EFL), pitch of point sources, than its 2D counterpart.

In accordance with this disclosure, a single-mode or few-mode slab (planar) waveguide may be used as a platform for a 1D projector. A slab waveguide is a waveguide that confines light in one dimension only while allowing the light to propagate and expand in the two remaining dimensions. Since the light is confined into the single layer ~0.2-2 µm thick, the projector can be very thin and have low volume and mass, especially when bonded to other flat functional components for mechanical support. Because of the light confinement in the direction of waveguide thickness, the light beam does not spread (diffract) out of plane, which is the physical effect that puts a low limit on the thickness of a free space cylindrical collimator. Additionally, gradual out-coupling of light from a slab waveguide, using, for example, grating or prism, enables the formation of a large area pupil while still preserving a thin form factor. By way of an example, a slab waveguide can create a 2×2 mm pupil while still be <2 mm thick. Furthermore, a slab waveguide, as other kinds of integrated optics, offers the advantage that even a complicated free form optics can be easily fabricated by photolithography.

A slab waveguide may include a variety of elements having optical (i.e. focusing or defocusing) power in plane of the waveguide. These optical elements may be refractive, reflective, or diffractive. Refractive optical elements may be formed by partially etching the core layer. This changes the effective refractive index of the guided optical mode, causing refraction, while the light is still confined within the waveguide. Transition between etched and non-etched region needs to be gradual to avoid light loss out of plane. This can be accomplished by using greytone etching and/or by using subwavelength binary structures to achieve apodization, for example. Reflective optical elements may be formed by using deep etch, with subsequent metallization of walls. This approach also enables path folding, reducing the longest dimension of the element. Diffractive optical elements may be formed by etching, as well.

In accordance with the present disclosure, there is provided a projector comprising an illumination waveguide layer comprising a first input port for receiving a first light beam, a slab waveguide portion optically coupled to the first input port for expanding the first light beam, and an output surface for outputting the first light beam expanded in the slab waveguide portion. A spatial modulator is optically coupled to the output surface of the illumination waveguide layer for spatially modulating the expanded first light beam to provide a line of light points. A collimation waveguide layer is optically coupled to the spatial modulator for receiving and collimating light of the light points to obtain a fan of collimated light beams at an exit pupil of the collimation waveguide layer, each collimated light beam of the fan having an angle corresponding to a coordinate of the corresponding light point of the line.

The slab waveguide portion of the illumination waveguide layer may include a curved reflector for collimating the first light beam in a plane of the slab waveguide portion. The illumination layer may include a first linear waveguide optically coupling the first input port to the slab waveguide portion, second and third input ports for receiving second and third light beams respectively, and second and third linear waveguides optically coupling the second and third input ports, respectively, to the slab waveguide portion. The slab waveguide portion may be configured for expanding the second and third light beams received at the second and third input ports, respectively. The first, second, and third linear waveguides may be disposed closer together proximate the slab waveguide portion than proximate the first, second, and third input ports. The projector may further include first, second, and third semiconductor light sources for emitting the first, second, and third light beams, respectively, and first, second, and third couplers for coupling the first, second, and third semiconductor light sources to the first, second, and third input ports of the illumination waveguide layer.

The spatial modulator may include an array of reflective pixels of variable reflectivity. The projector may further include a coupling element for coupling the expanded first light beam outputted from the illumination waveguide layer to the array of reflective pixels, and for coupling the expanded first light beam reflected from the array of reflective pixels into the collimation waveguide layer. The coupling element may include a holographic optical element configured to direct different wavelength components of the expanded first light beam onto different pluralities of micromirrors of the micromirror array. The coupling element may further include a cylindrical optical element for collimating the expanded first light beam in a plane perpendicular to a plane of the slab waveguide portion.

In embodiments where the collimation waveguide layer comprises a slab waveguide portion comprising two coaxial curved reflectors, the slab waveguide portion may include a few-mode waveguide, and/or an evanescent out-coupler for out-coupling the fan of collimated light beams from the collimation waveguide layer. The illumination and collimation waveguide layers may be parts of a same waveguide structure, or may even be combined into a same waveguide layer.

In some embodiments, the projector further includes a tiltable reflector at the exit pupil of the collimation waveguide. The tiltable reflector may be configured to receive and redirect the fan of collimated light beams in a plane non-parallel to a plane of the fan of collimated light beams. The spatial modulator may include an array of tiltable micromirrors. The projector may include a coupling element for coupling the expanded first light beam outputted from the illumination waveguide layer to the array of tiltable micromirrors, and for coupling the expanded first light beam reflected from the array of tiltable micromirrors into the collimation waveguide layer. The array of tiltable micromirrors may be operable to selectively tilt micromirrors of the array to provide spatial modulation of amplitude of the expanded first light beam.

In accordance with the present disclosure, there is provided a waveguide projector comprising an input port for receiving a first light beam, an array of Mach-Zehnder interferometers (MZIs) coupled to the input port and configured for redistributing optical power of the first light beam between light points of a line of light points in response to control signals applied to MZIs of the array, and a slab waveguide portion coupled to the array of MZIs and configured for receiving and collimating light of the light points to obtain a fan of collimated light beams at an exit pupil, each collimated light beam of the fan having an angle corresponding to a coordinate of the corresponding light point of the line of light points.

The slab waveguide portion may include at least one of: a pair of coaxial curved reflectors; a few-mode waveguide; or an evanescent out-coupler for out-coupling the fan of collimated light beams from the slab waveguide portion. The waveguide projector may further include a tiltable reflector at the exit pupil. The tiltable reflector may be configured to receive and redirect the fan of light beams in a plane non-parallel to a plane of the fan of collimated light beams.

In accordance with the present disclosure, there is further provided a method for projecting a light beam. The method includes receiving the light beam at an input port of an illumination waveguide layer, expanding the light beam in a slab waveguide portion of the illumination waveguide layer, spatially modulating the expanded light beam to provide a line of light points, and collimating light of the light points to obtain a fan of collimated light beams at an exit pupil, each collimated light beam of the fan having an angle corresponding to a coordinate of the corresponding light point of the line. The method may further include redirecting the fan of collimated light beams in a plane non-parallel to a plane of the fan, using a tiltable reflector at the exit pupil.

Figure 1B:
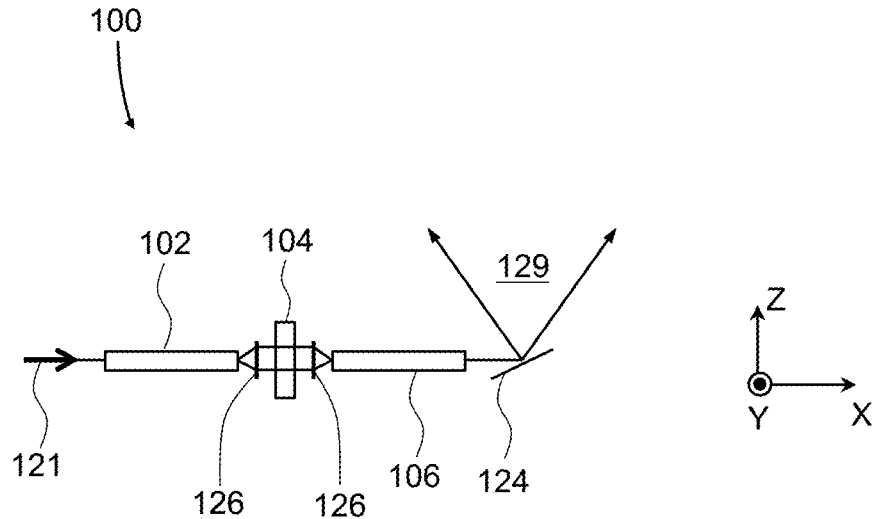

Referring now to FIGS. 1A and 1B, a projector 100 includes an illumination waveguide layer 102 optically coupled to a spatial modulator 104, which is optically coupled to a collimation waveguide layer 106. The illumination waveguide layer 102 includes an input port 111 for receiving a light beam 121 and a slab waveguide portion 114 optically coupled to the input port 111 for expanding the light beam 121 received at the input port 111. The light beam 121 is expanded in Y-direction upon propagation of the light beam 121 in X-direction. The light beam 121 remains confined along Z-direction due to the guiding property of the slab waveguide portion 114. The expanded light beam is shown at 125. The illumination waveguide layer 102 includes an output surface 116 for outputting the light beam 121 expanded in the slab waveguide portion 114 along Y-direction.

The spatial modulator 104 is optically coupled to the output surface 116 of the illumination waveguide layer 102 for spatially modulating the expanded light beam 125. The spatial modulator 104 adjusts an amplitude and/or phase of the expanded light beam 125 in a spatially selective manner along Y axis to provide a line of light points 118, each light point 118 being characterized by an amplitude and/or a phase of the light field. For example, the spatial modulator 104 may provide a spatially selective attenuation of the expanded light beam 125.

The collimation waveguide layer 106 is optically coupled to the spatial modulator 104. The collimation waveguide layer 106 receives and collimates light of the light points 118 to obtain a fan of collimated light beams 127 (FIG. 1A) at an exit pupil 122 of the collimation waveguide layer 106. Each collimated light beam 127 of the fan has an angle corresponding to Y-coordinate of the corresponding light point 118 of the line of light points 118. Thus, the projector 100 provides a line of image in angular domain. A pair of cylindrical lenses 126 may be used to collimate the expanded light beam 125 in XZ plane (FIG. 1B).

In some embodiments, the projector 100 may further include a tiltable reflector 124 at the exit pupil 122 of the collimation waveguide 106. The tiltable reflector 124 may be configured to receive and redirect, e.g. scan, the fan of collimated light beams 127 in XZ plane, or more generally in any plane non-parallel to a plane of the fan of collimated light beams 127, i.e. XY plane in FIG. 1A, to obtain a scanned beam fan 129. In some embodiments, the tiltable reflector 124 may include a microelectromechanical system (MEMS) 1D reflector tiltable about a single axis, which is parallel to Y axis in this example.

Figure 2A:
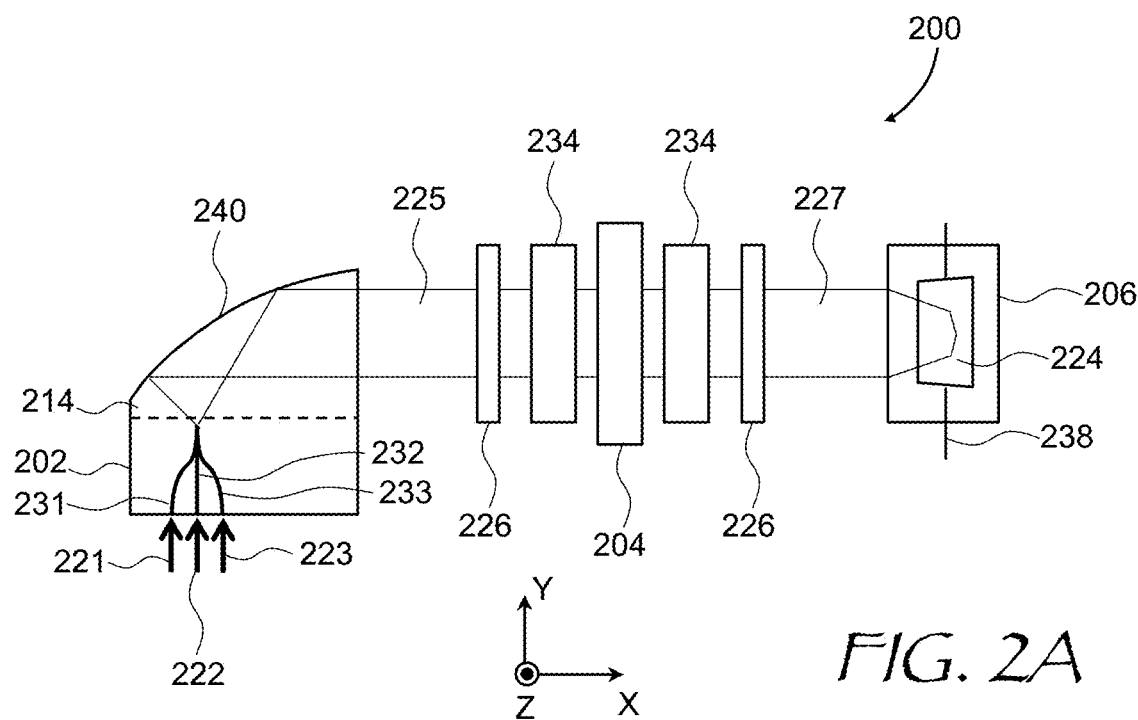
FIGS. 2A and 2B are plan and side schematic views, respectively, of an embodiment of the projector of FIGS. 1A and 1B, the embodiment including an illumination waveguide for coupling three light sources.
Figure 2B:
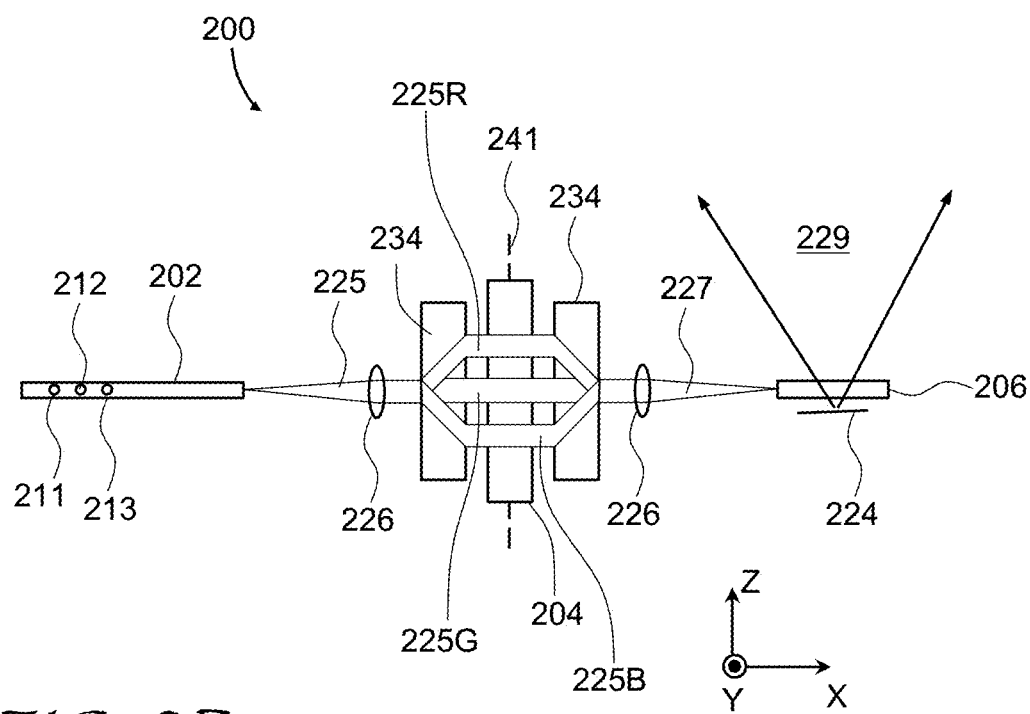

Referring to FIGS. 2A and 2B, a projector 200 is an embodiment of the projector 100 of FIGS. 1A and 1B, and includes similar elements. The projector 200 of FIGS. 2A and 2B includes an illumination waveguide layer 202 optically coupled to a spatial modulator 204, which is optically coupled to a collimation waveguide layer 206. The illumination waveguide layer 202 includes first 211, second 212, and third 213 input ports for receiving first 221, second 222, and third 223 light beams respectively, which can be e.g. light beams carrying different color channels of an image to be displayed. The illumination waveguide layer 202 includes a slab waveguide portion 214 optically coupled to the first 211, second 212, and third 213 input ports by first 231, second 232, and third 233 linear waveguides respectively. Herein, the term "linear waveguide" denotes a waveguide that bounds the light propagation in two dimensions, like a light wire. A linear waveguide may be straight, curved, etc.; in other words, the term "linear" does not necessarily imply a straight waveguide section. One example of a linear waveguide is a ridge-type waveguide.

The first 231, second 232, and third 233 linear waveguides are disposed closer together proximate the slab waveguide portion 214 than proximate the first 211, second 212, and third 213 input ports. It is to be noted that the first 231, second 232, and third 233 linear waveguides do not need to coalesce at the slab waveguide portion 214 for the projector 200 to be operational. The offset position of the first 231, second 232, and third 233 linear waveguides may be accounted for in software/firmware running on a controller of the projector 200.

In the embodiment shown in FIG. 2A, the slab waveguide portion 214 of the illumination waveguide layer 202 includes a curved in-plane reflector 240 for collimating the light beams 221, 222, and 223 in a plane of the slab portion, i.e. in XY plane in FIGS. 2A, 2B, to obtain expanded light beams 225. The curved reflector 240 may be an off-axis reflector as shown, or an on-axis reflector in some embodiments. The expanded light beams 225 may be nearly collimated in XY plane while diverging in Z direction, as seen in FIG. 2B. The expanded light beam 225 is diverging in XZ plane until collimated by a cylindrical optical element 226.

In some embodiments, the first 221, second 222, and third 223 light beams are generated by separate light sources providing light of red (R), green (G), and blue (B) color channels. The configuration of the projector 200 enables light of the R, G, and B color channels to be independently spatially modulated. To that end, the projector 200 may include a pair of coupling elements 234 for coupling different color channels 225R, 225G, and 225B of the expanded light beams 225 to different areas of the spatial modulator 204 as illustrated in FIG. 2B, enabling the spatial modulator 204 to independently spatially modulate the color channels 225R, 225G, and 225B. The right-hand-side coupling element 234 combines the color channels 225R, 225G, and 225B after independent spatial modulation.

In some embodiments, the spatial modulator 204 may include a 2D array of tiltable micromirrors, light of the different color channels 225R, 225G, and 225B illuminating different portions of the array of tiltable micromirrors, light of each color channel illuminating multiple micromirrors. By independently tilting some of the micromirrors out of optical path of the light of color channels 225R, 225G, and 225B, different attenuation levels/output brightness levels for each one of the color channels 225R, 225G, and 225B may be provided—a feature considered in more detail in FIG. 2C. The coupling elements 234 (FIGS. 2A and 2B) may include a pair of spaced apart volume Bragg gratings (VBGs), surface relief gratings or a set of dichroic mirrors, configured to direct different wavelength components of the expanded light beam onto different pluralities of micromirrors of the micromirror array.

The attenuated color channels 225R, 225G, and 225B are combined by the right-hand-side coupling element 234 into a collimated modulated beam 227, which is focused by the right-hand-side cylindrical optical element 226 into the collimation waveguide layer 206. The collimation waveguide layer 206 collimates light of the light points 118, and outputs the light out of plane of the collimation waveguide layer 206 in downward direction in FIG. 2B (i.e. against the direction of Y axis) to obtain a fan of collimated light beams 229. The fan of collimated light beams 229 is scanned by a reflector 224 about an axis 238 (FIG. 2A) parallel to Y-axis. Configurations of the collimation waveguide layer 206 configured for emitting out-of-plane light will be considered further below.

The portion of the projector 200 including the spatial modulator 204, the coupling elements 234, and the cylindrical optical elements 226 is symmetrical about an axis 241. Thus, a reflective optical configuration may be adopted that only requires one coupling element 234, one cylindrical optical element 226, and a reflective spatial modulator 204'.

Figure 2C:
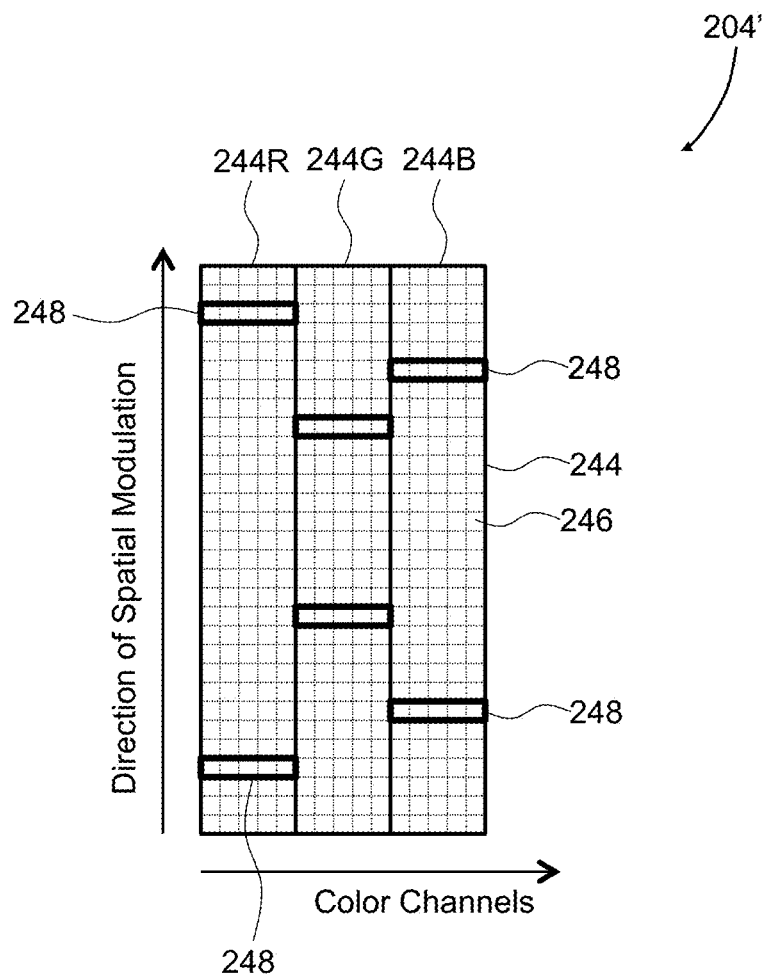
FIG. 2C is a plan view of a 2D reflective spatial modulator illustrating an independent spatial modulation of light of different color channels.

Referring to FIG. 2C, an exemplary reflective spatial modulator 204' is shown in plan view. The reflective spatial modulator 204' includes a 2D array 244 of tiltable micromirrors 246, each micromirror 246 tiltable between two positions, one position reflecting light on its path towards an output aperture of the projector 200, and the other position reflecting light away from the optical path, e.g. towards an optical dump. Thus, each micromirror 246 operates in an on/off mode for a portion of a light beam impinging on that micromirror. The 2D array 244 of micromirrors 246 may be broken down into three vertical sections or areas 244R, 244G, and 244B for reflecting light of R, G, and B color channels respectively. The light has been spread apart using the coupling elements 234. A horizontal row 248 of micromirrors 246 within each of the vertical areas 244R, 244G, and 244B can be used to vary optical attenuation of a single point of light, horizontal rows 248 at different height operating to vary optical attenuation of different points of light, independently for each color channel as shown. When all micromirrors 246 of the rows 248 are in OFF position, all the light at that light point will be deflected and dumped, corresponding to a black level of the point of the image to be projected. When all micromirrors 246 of the rows 248 are in ON position, maximum brightness of the image point results. To achieve different shades of each color channel, some of the micromirrors 246 of the rows 248 may be in ON position, and some in OFF position. Thus, the array 244 of tiltable micromirrors 246 is operable to selectively tilt micromirrors 246 of the array 244 to provide independent spatial modulation of amplitude of individual color channels of the expanded light beam 225. More generally, the reflective spatial modulator 204' may include any array of reflective pixels of variable reflectivity. For example, an array of diffractive reflectors, or grating light valves, may be used.

Figure 3A:
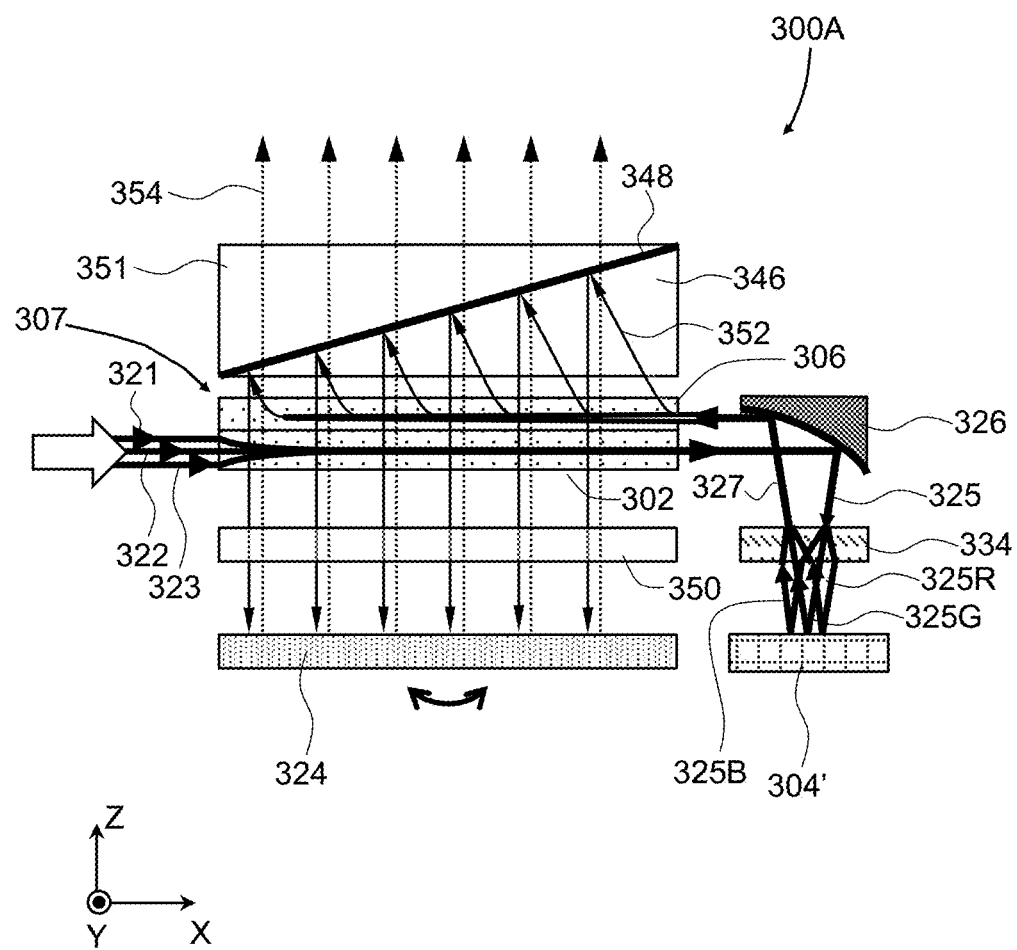
FIG. 3A is a schematic side view of a projector of this disclosure including a waveguide structure coupling together a MEMS tiltable reflector and a MEMS micromirror array.

Turning to FIG. 3A, an example reflective projector configuration is presented. A projector 300A is an embodiment of the projector 200 of FIGS. 2A and 2B, and includes similar elements. The projector 300A includes an illumination waveguide layer 302 optically coupled to a reflective spatial modulator 304' by a coupler including an off-axis curved reflector 326, e.g. a cylindrical reflector, and a wavelength dispersing element 334. The off-axis curved reflector 326 may be replaced with a cylindrical optical element such as a cylindrical lens, for example, optionally coupled to a turning flat mirror. The reflective spatial modulator 304' is optically coupled to a collimation waveguide layer 306 via the same wavelength dispersing element 334 and the curved reflector 326. The illumination waveguide layer 302 receives first 321, second 322, and third 323 light beams carrying R, G, and B color channels, respectively, of an image to be displayed. In this embodiment, the illumination 302 and collimation 306 waveguide layers are parts of a same multilayer waveguide structure 307.

The first 321, second 322, and third 323 light beams are coupled into the illumination layer 302, which expands and collimates the first 321, second 322, and third 323 light beams in XY plane. Upon exiting the illumination layer 302, the expanded light beam 325 diverges vertically (in Z-direction) while propagating in X-direction, and is collimated and redirected by the curved reflector 326 towards the reflective spatial modulator 304' via the wavelength dispersing element 334, which splits the expanded light beam 325 into components 325R, 325G, and 325B carrying individual R, G, and B color channels, respectively. The operation of the reflective spatial modulator 304' with light of R, G, and B channels is similar to the reflective spatial modulator 204' of FIG. 2C considered above. The color channel components 325R, 325G, and 325B impinge onto different areas of the reflective spatial modulator 304', enabling independent spatially selective attenuation of the R, G, and B color channels. The reflected components 325R, 325G, and 325B propagate back towards the curved reflector 326. On their way, the reflected components 325R, 325G, and 325B are recombined by the wavelength dispersing element 334 forming a combined beam 327, which is coupled into the collimation waveguide layer 306. The combined light beam 327 forms a line of light points of an RGB image to be displayed at an in-coupling edge of the collimation waveguide layer 306, in a similar manner as has been explained above with reference to FIGS. 1A and 1B. The collimation waveguide layer 306 (FIG. 3A) collimates light of the light points to obtain a fan of collimated light beams. Each collimated light beam of the fan has an angle corresponding to a coordinate of the corresponding light point of the line.

The collimated light is out-coupled from the collimation waveguide layer 306 by a prismatic evanescent out-coupler 346 as indicated by arrows 352, is reflected by a polarization-selective reflector 348 to propagate through the collimation waveguide layer 306, through a quarter-wave waveplate (QWP) 350. The light impinges onto a tiltable reflector 324, e.g. a microelectromechanical system (MEMS) reflector tiltable about a single axis, which reflects the light to propagate back at a variable angle in XZ plane through the QWP 350 and through the evanescent out-coupler 346, the polarization-selective reflector 348, and a matching prism 351, as indicated by arrows 354. On its way back, the light substantially does not reflect from the polarization-selective reflector 348, because the double-pass propagation through the QWP 350 changes the light polarization to an orthogonal polarization. The matching prism 351 may have the same shape as the prismatic evanescent out-coupler 346 and an opposite orientation, such that the prismatic evanescent out-coupler 346 and the matching prism 351 sandwich the polarization-selective reflector between their diagonals, and form a plano-parallel plate that does not redirect light propagating through the plate. The collimation optics of the projector 300A may be configured such that the conjugate plane of the reflective spatial modulator 304' is disposed proximate to, or directly at the tiltable reflector 324. The operation of the illumination waveguide layer 302, the illumination waveguide layer 306, the evanescent out-coupler 346, and the tiltable reflector 324 will be considered in more detail further below.

Figure 3B:
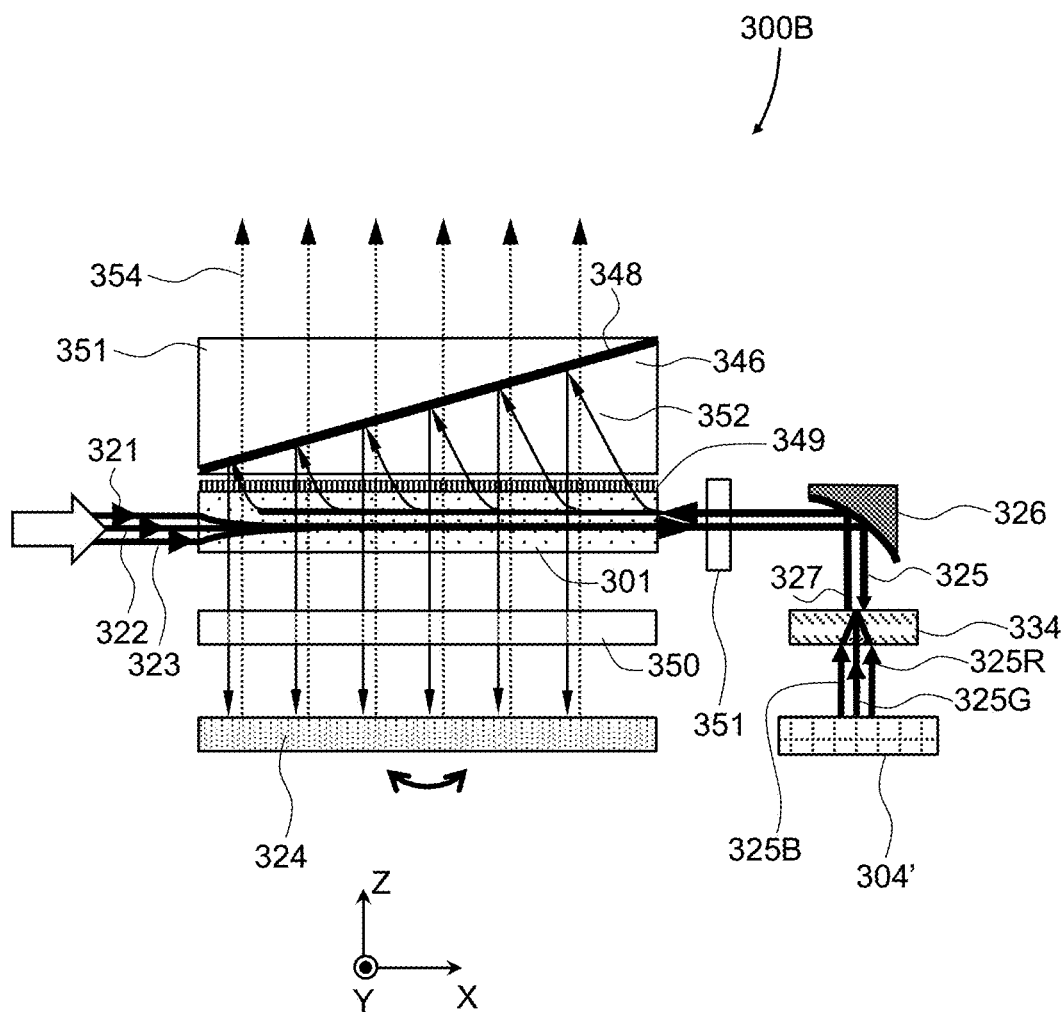
FIG. 3B is a schematic side view of a projector with combined illumination and collimation waveguide layers.

Turning to FIG. 3B, a projector 300B is an embodiment of the projector 300A of FIG. 3A, includes similar elements, and operates in a similar manner. In the projector 300B of FIG. 3B, the illumination waveguide layer 302 and the collimation waveguide layer 306 are combined into a same first waveguide layer 301, which combines the functions of the collimation waveguide layer 306 and the illumination waveguide layer 302 of the projector 300A of FIG. 3A. The light beam 325 (FIG. 3B) may be coupled into a same or different lateral optical mode of the first waveguide layer 301. The light beams 325 propagating in opposite directions may be separated by polarization. A QWP 351 may be provided to change the polarization of the light beams 325 to an orthogonal polarization upon double-pass propagation in the first waveguide layer 301, and a polarization-selective out-coupler 349 may be provided that only out-couples light of the orthogonal polarization propagating from right to left in FIG. 3B.

Figure 4:
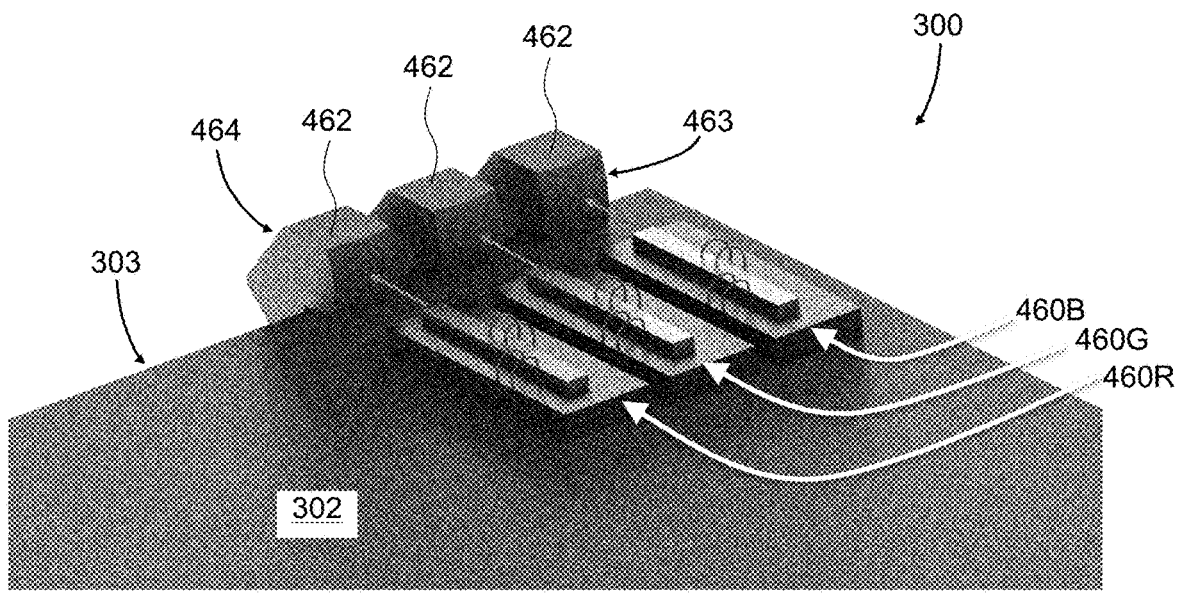
FIG. 4 is an isometric view of three diode light sources coupled to an illumination waveguide layer of the projector of FIG. 3.
Figure 5:
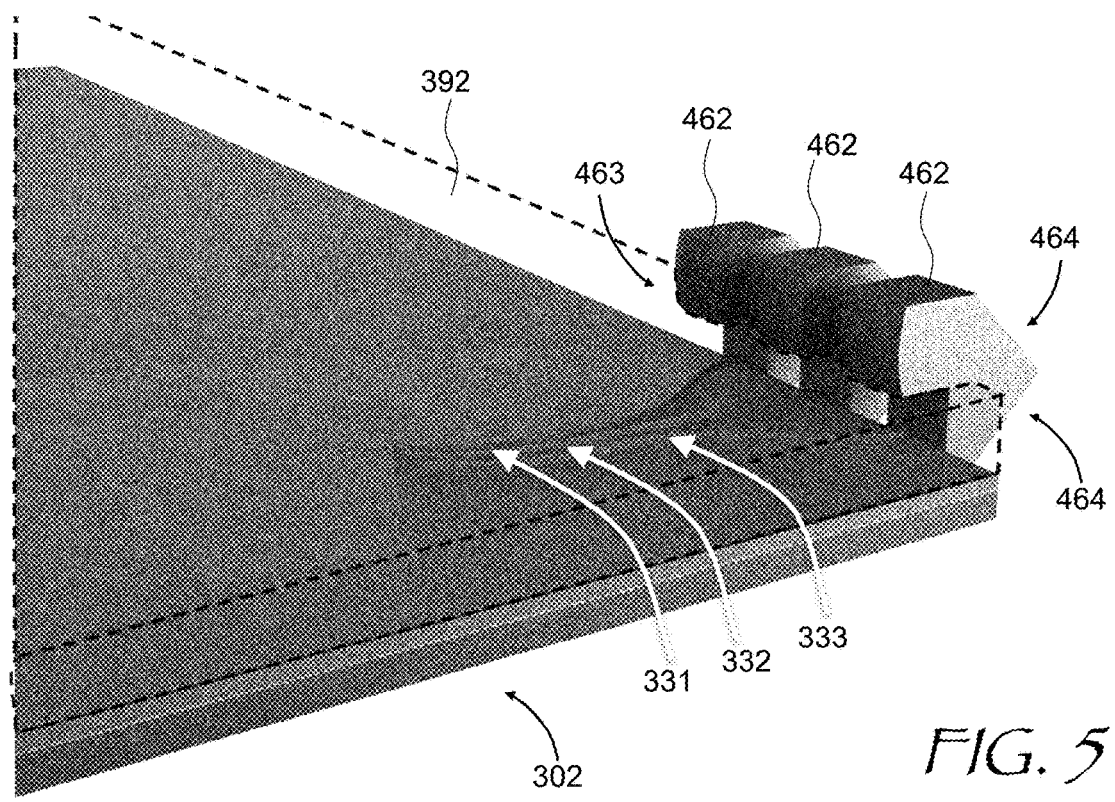
FIG. 5 is an isometric view of the illumination waveguide layer of FIG. 4 including three linear waveguides for coupling the diode light sources to a slab waveguide portion of the illumination waveguide layer.

Referring to FIGS. 4 and 5, diode light sources 460R, 460G, and 460B (FIG. 4), e.g. light emitting diodes (LEDs), superluminescent light-emitting diode (sLEDs), laser diodes (LDs) etc., may be used to produce light of the R, G, and B color channels, respectively, of an image to be displayed by the projector 300. The diode light sources 460R, 460G, and 460B may be coupled to the illumination waveguide layer 302 of the projector 300 by means of reflective couplers 462. Each reflective coupler 462 includes a refractive surface 463 for refocusing light beams emitted by the diode light sources 460R, 460G, and 460B into linear waveguides 331, 332, and 333, respectively (FIG. 5) of the illumination waveguide layer 302. Each reflective coupler 462 may further include a couple of reflective faces 464 for turning the light beams 321, 322, and 323 around an edge 303 (FIG. 4) of the illumination waveguide layer 302. In FIG. 5, the diode light sources are removed to show the linear waveguides 331, 332, and 333 that are covered by a top cladding 392, which is shown in FIG. 5 with dashed lines. The reflective couplers 462 are supported by the top cladding 392. The coupling configuration presented in FIGS. 4 and 5 is only an example; other coupling configurations may be used.

Figure 6A:
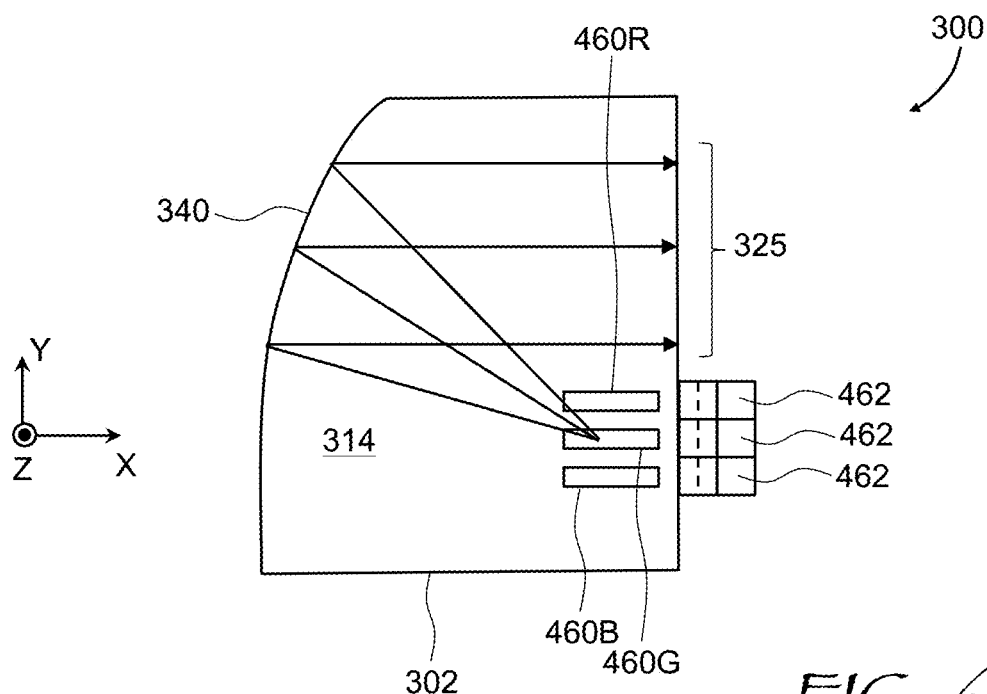
FIG. 6A is a plan schematic view of the slab waveguide portion of FIG. 5.

Referring to FIG. 6A, the illumination waveguide layer 302 of the waveguide structure 307 includes a slab waveguide portion 314 for expanding the light beams emitted by the diode light sources 460R, 460G, and 460B and propagated in the linear waveguides 331, 332, and 333 (FIG. 5), respectively. A reflector 340 (FIG. 6A) across the slab waveguide portion 314 collimates the expanded light beams 325 in the plane of the slab waveguide portion 314. The expanded light beams 325 remain guided in Z-direction.

Figure 6B:
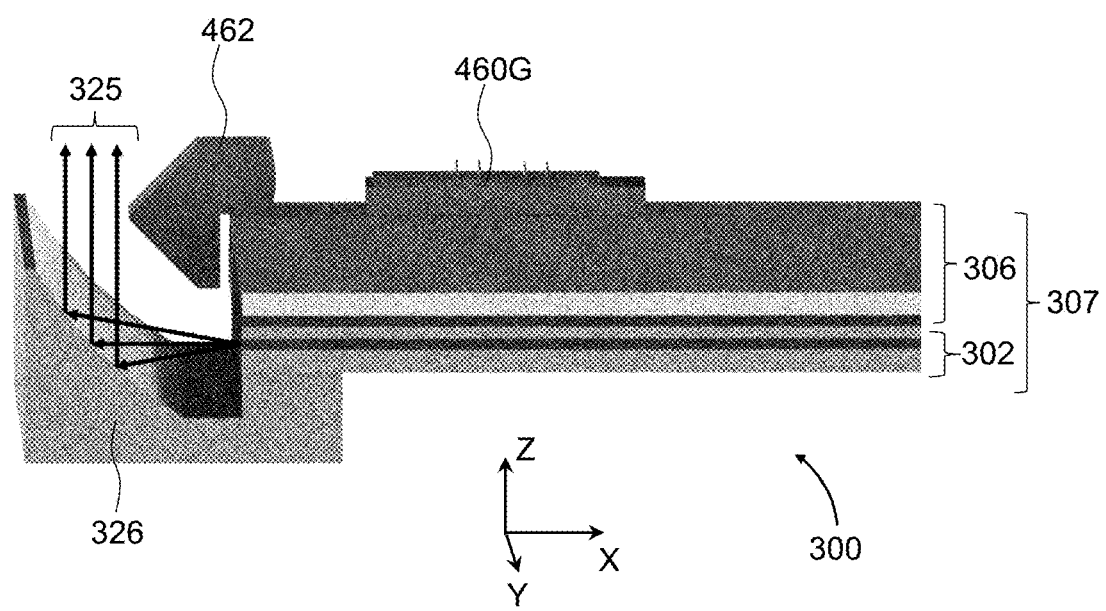
FIG. 6B is a three-dimensional view of the slab waveguide portion of FIG. 6A.

The optical path of the expanded light beams 325 is illustrated in FIG. 6B. The expanded light beams 325 diverge in Z-direction. The expanded light beams 325 are reflected by the curved reflector 326 upwards in FIG. 6B, collimating the light beams 325 upon reflection from the curved reflector 326.

Figure 7A:
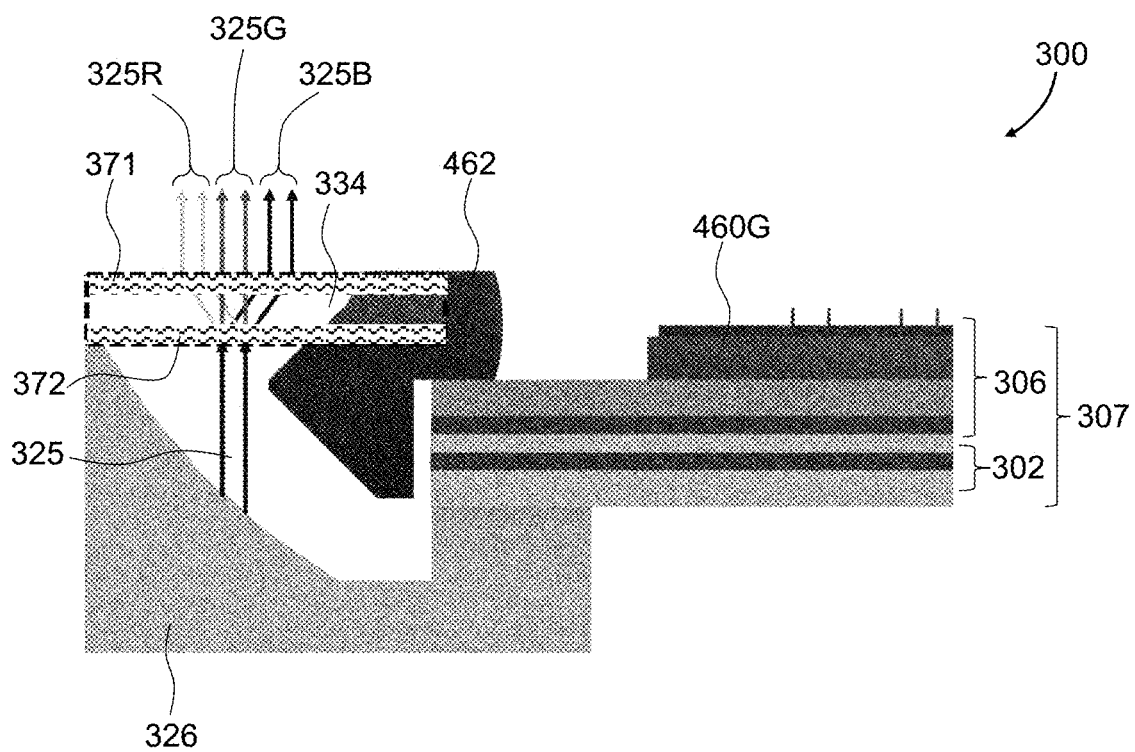
FIG. 7A is a side cross-sectional view of the waveguide structure of FIG. 3 showing rays of light out-coupled from an illumination waveguide layer.
Figure 7B:
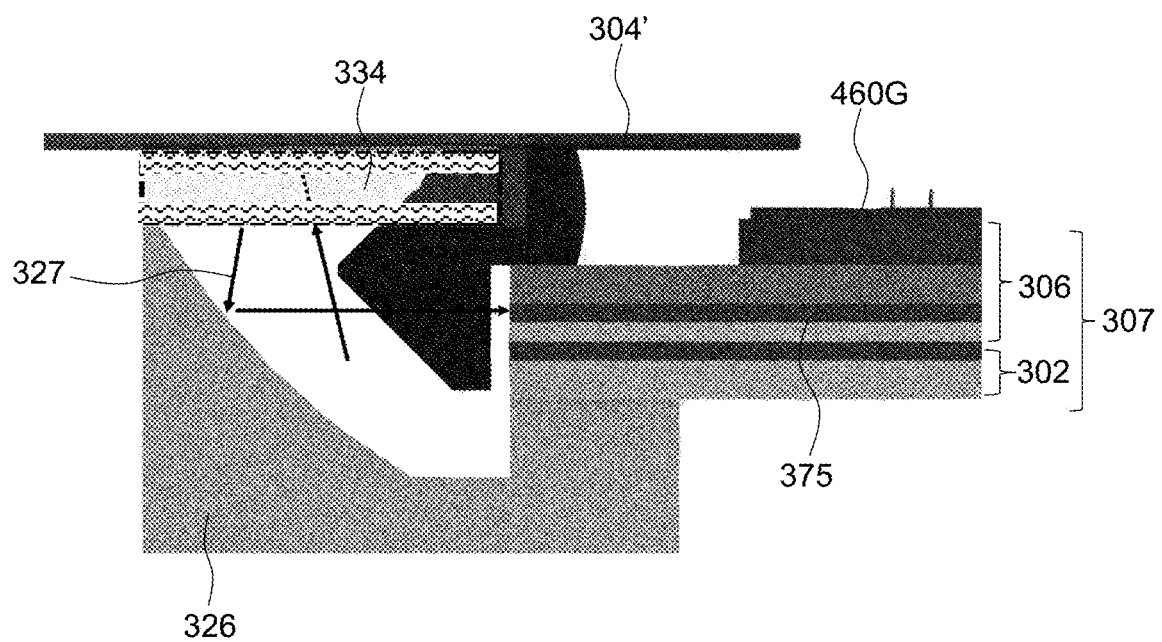
FIG. 7B is a side cross-sectional view of the waveguide structure of FIG. 3 showing rays of light in-coupled into a collimation waveguide layer.

The further path of the expanded light beams 325 is illustrated in FIG. 7A, where the expanded light beams 325 impinge onto the wavelength dispersing element 334. The wavelength dispersing element 334 may include first 371 and second 372 VBGs. The first VBG 371 angularly disperses the R, G, B color channel components 325R, 325G, and 325B, and the second VBG 372 redirects the R, G, B color channel components 325R, 325G, and 325B, e.g. to make them parallel again. The wavelength dispersing element 334 may include at least one holographic optical element (HOE), diffraction grating, dichroic mirror, etc. This enables the R, G, B color channel components 325R, 325G, and 325B to be directed to different areas of the reflective spatial modulator 304', as was explained above with reference to FIG. 2C and FIG. 3. Turning to FIG. 7B, the combined beam 327 get focused by the curved reflector 326 into a core 375 of the collimation waveguide layer 306. The wavelength dispersing element 334 is a reciprocal element, i.e. the light propagating in a backward direction repeats the optical path of incoming light. A slight angle may be given to the reflected light e.g. by tilting the reflective spatial modulator 304', to make the combined beam 327 focused by the curved reflector 326 couple into the core 375 of the collimation waveguide layer 306.

Figure 8A:
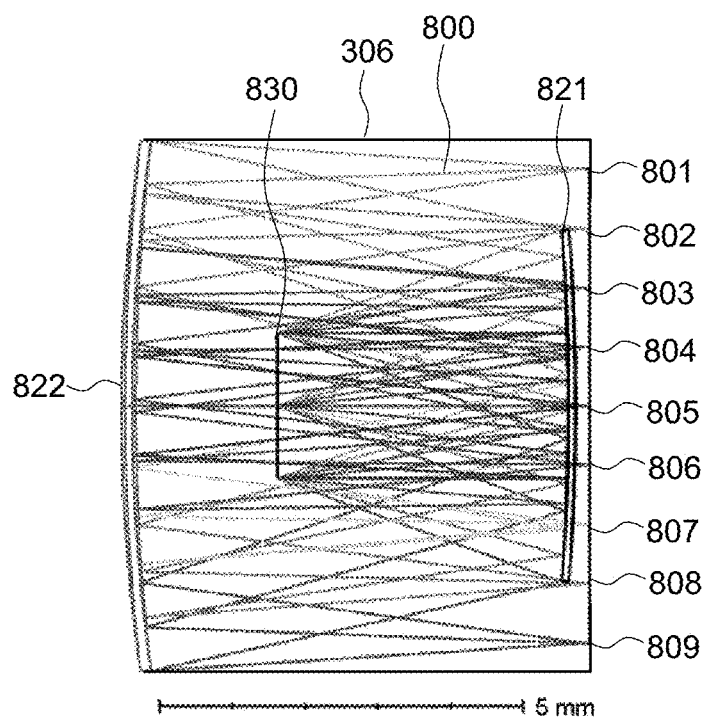
FIG. 8A is a plan ray-traced view of the collimation waveguide layer.

The operation of the collimation waveguide layer 306 is illustrated in the XY-plane view of FIG. 8A. The collimation waveguide layer 306 may include first 821 and second 822 coaxial curved reflectors proximate opposed faces of the collimation waveguide layer 306. Rays 800 in FIG. 8A have been traced backwards, that is, from the collimated state at the focal plane 830 to focal spots 801, 802, 803, 804, 805, 806, 807, 808, and 809. Different focal spots 801-809 correspond to different angles of the collimated light beams forming the focal spots 801-809. The different beam angles are also termed "field angles". Optical aberrations at various field angles may be evaluated by analyzing how well collimated light beams at different field angles are focused by the pair of first 821 and second 822 curved reflectors. The shapes of the first 821 and second 822 curved reflectors has been optimized using optical design software.

Figure 8B:
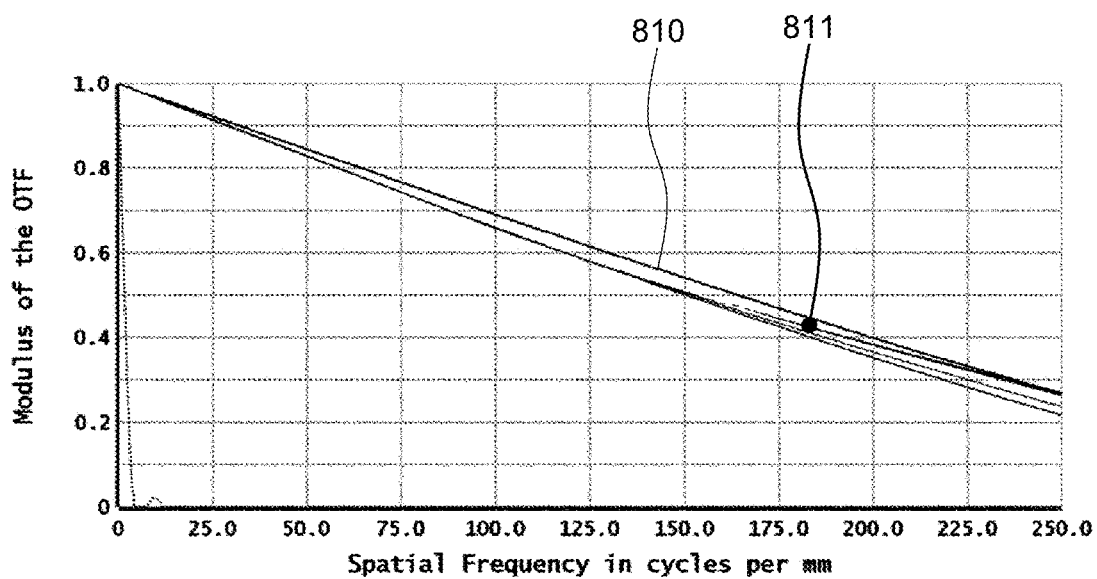
FIG. 8B is an optical transfer function (OTF) plot of the collimation waveguide layer of FIG. 8A.

The results of OTF computations are presented in FIG. 8B, where the OTF modulus 811 has been computed for the field angles ranging from −30 degrees to +30 degrees in air. The OTF curves corresponding to the spots 801-809 are disposed close to one another and thus are labeled by a single reference numeral 811 for simplicity. It is seen that at all the field angles, the OTF performance is very close to the best theoretically achievable, diffraction-limited performance represented by an ideal OTF curve 810, for +−30 degrees FOV.

Figure 9A:
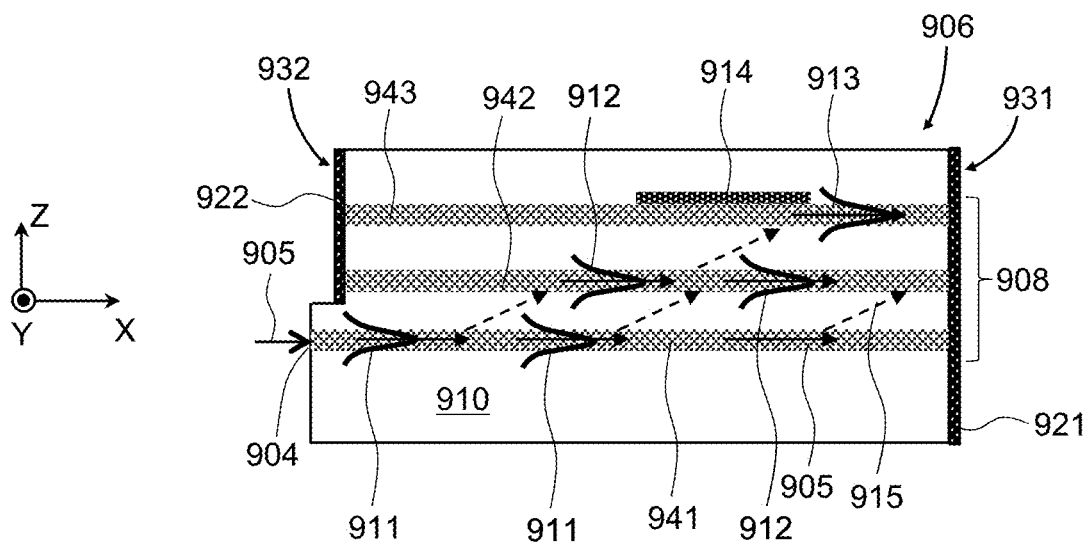
FIGS. 9A, 9B, and 9C are side cross-sectional views of an illumination waveguide layer including three evanescently coupled slab cores and a pair of opposed reflectors, the views showing forward, backward, and second forward propagation, respectively, of a light beam the slab cores.
Figure 9B:
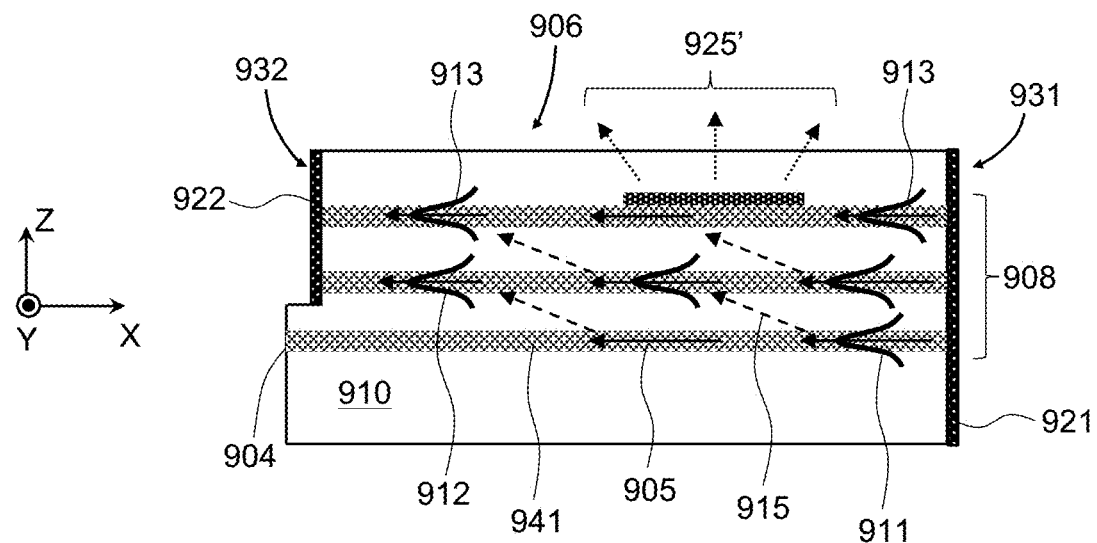
Figure 9C:
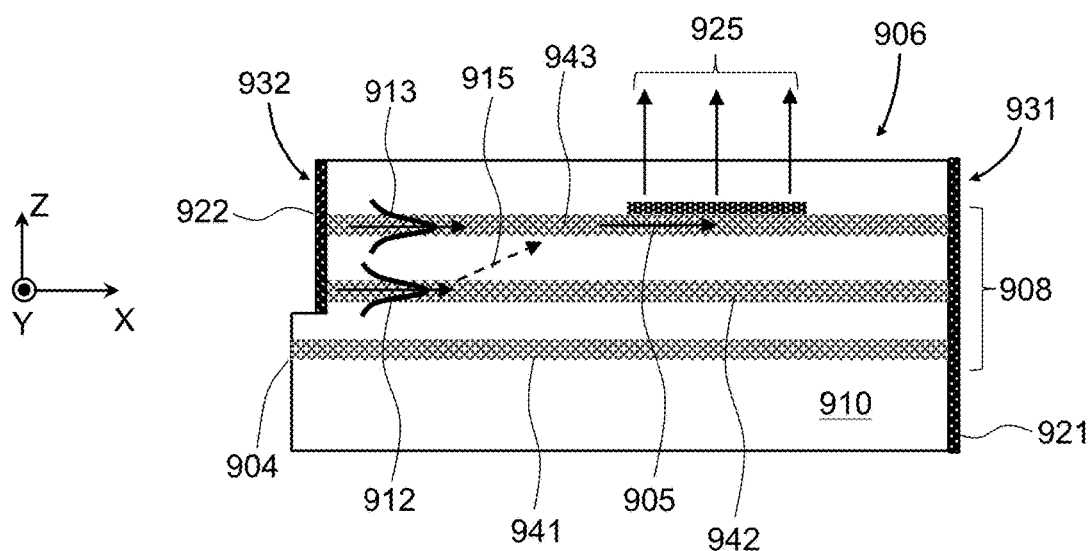

Example embodiments of the collimation waveguide layer 306 enabling multipass propagation of light between the first 821 and second 822 coaxial curved reflectors will now be considered. Referring first to FIGS. 9A, 9B, and 9C, a collimation waveguide layer 906 is a variant of the collimation waveguide layer 306 of FIGS. 3 and 8A. The collimation waveguide layer 906 of FIGS. 9A-9C receives a light beam 905 at an input port 904 of the collimation waveguide layer 906. The collimation waveguide layer 906 includes a slab core structure 908 optionally supported by a substrate 910. First 921 and second 922 coaxial reflectors are coupled to the slab core structure 908 at opposed first 931 and second 932 edges of the collimation waveguide layer 906. An out-coupling region 914 is provided over the slab core structure 908 between the first 921 and second 922 reflectors, for out-coupling of light propagated in the slab core structure 908. The first 921 and second 922 reflectors may be curved in XY plane to have focusing power in XY plane, i.e. in the plane of the collimation waveguide layer 906, for collimation of the light beam 905 received at the input port 904 of the collimation waveguide layer 906 and out-coupled at the out-coupling region 914 of the collimation waveguide layer 906. Coaxial orientation of the first 921 and second 922 curved reflectors facilitates reduction of optical aberrations.

The slab core structure 908 includes parallel evanescently coupled first 941, second 942, and third 943 slab cores, e.g. singlemode or few-mode cores. Herein, the term "few-mode" refers to a waveguide that may support up to 12 different lateral modes of propagation. The first 941, second 942, and third 943 slab cores are offset from one another in a direction of thickness of the collimation waveguide layer 906, i.e. along Z-axis in FIGS. 9A, 9B, and 9C. The slab core structure 908 supports first 911, second 912, and third 913 optical modes of propagation of in-coupled light in the first 941, second 942, and third 943 slab cores respectively.

In operation, the light beam 905 is coupled at the input port 904 into the first slab core 941 supporting the first optical mode 911. The light beam 905 propagates towards the first edge 931 of the collimation waveguide layer 906. The first reflector 921 disposed opposite the input port 904 reflects the light beam 905 to propagate back in the slab core structure 908 (FIG. 9B), towards the second edge 932. The collimation waveguide layer 906 is configured to convert the light beam 905 from the first optical mode 911 to the second optical mode 912 and further to the third optical mode 913 upon propagation in the slab core structure 908 towards the first reflector 921 (FIG. 9A), back towards the second reflector 922 (FIG. 9B), and forward again, towards the out-coupling area 914 (FIG. 9C) after reflecting from the second reflector 124. The intermodal transitions are denoted with the dashed arrows 915. To provide the required coupling of the light energy from the first optical mode 911 to the second optical mode 912 and further to the third optical mode 913, the first 941, second 942, and third 943 slab cores may be offset from one another by a distance (separation) in the direction of thickness of the collimation waveguide layer 906, i.e. in Z-direction, at which a major portion, e.g. at least 50%, 60%, 70%, 80%, 90%, or more, of the light beam 905 is converted from the first optical mode 911 propagating in the first slab core 941 to the third optical mode 913 propagating in the third slab core 943 via the second optical mode 912 propagating in the second slab core 942 when the light beam 905 reflected from the both the first 921 and second 922 reflectors reaches the out-coupling region 914. It is noted that the conversion of the light beam 905 from the first optical mode 911 to the second optical mode 912 and further to the third optical mode 913 is performed along the entire optical path of propagation of the light beam 905 from the input port 904 to the first reflector 921 (i.e. in the positive direction of X-axis), back to the second reflector 922 (i.e. in the negative direction of X-axis), and to the out-coupling region 914 (in the positive direction of X-axis), as illustrated in FIGS. 9A, 9B, and 9C.

The function of the out-coupling region 914 is to out-couple at least the portion 925 of the light beam 905 propagating in the third optical mode 913 (i.e. in the third slab core 943) from the collimation waveguide layer 906. The out-coupling region 914 may be disposed and configured to maximize the portion 925 of the light beam propagating in the third slab core 913 after reflection from the second reflector 922 i.e. in the direction of X-axis, while reducing the unwanted out-coupling of light 925' propagating in the third slab core 913 from the first reflector 921 to the second reflector 922. The out-coupling region 914 may include, for example, an out-coupler evanescently coupled to the third slab core 943. The out-coupler may include a diffraction grating or an optical element such as a prism, a transparent plate, a prismatic mirror, etc., having a refractive index higher than the effective refractive index for the third optical mode 913 propagating in the third slab core 943. The first 921 and second 922 reflectors may have optical power, i.e. focusing or defocusing power, for at least partial collimation of the light beam 905 received at the input port 904 in a plane of the slab core structure, i.e. in XY plane in FIGS. 9A, 9B, and 9C. In some embodiments, coupling between the slab cores 941, 942, and 943 may be achieved by diffractive reflectors disposed one over the other in neighboring slab cores. The light beam 905 is diffracted by a diffractive reflector out of the slab core and towards a diffractive reflector disposed in a neighboring core.

Figure 10:
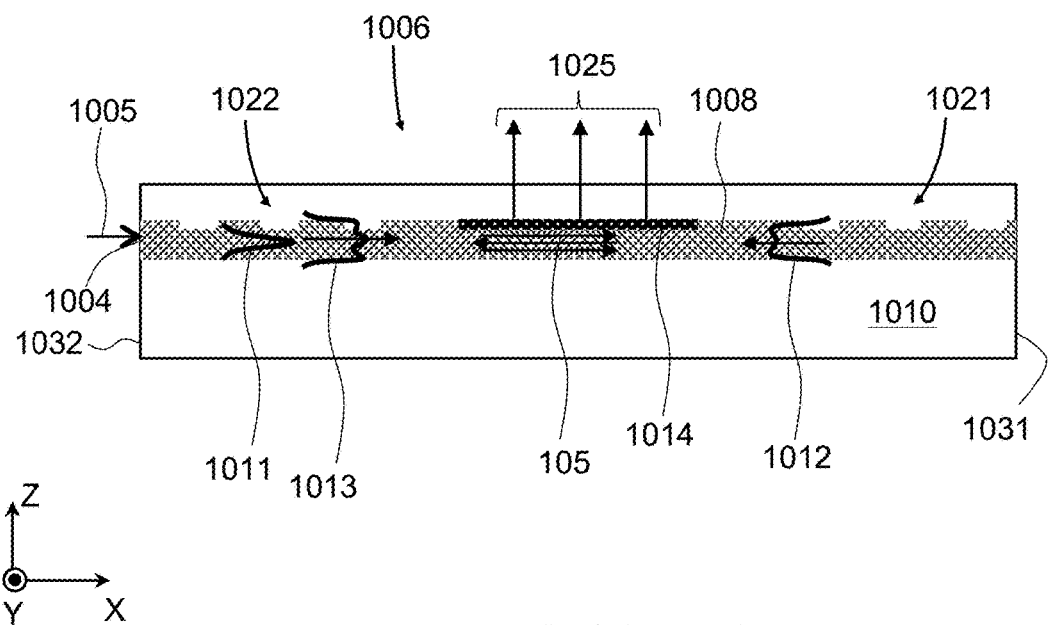
FIG. 10 is a side cross-sectional view of an illumination waveguide layer including a few-mode core structure coupled to a pair of opposed diffractive reflectors, showing forward and backward propagation of a light beam in the few-mode core structure.

Referring to FIG. 10, a collimation waveguide layer 1006 is another variant of the collimation waveguide layer 306 of FIGS. 3 and 8A. The collimation waveguide layer 1006 includes a slab core structure 1008 optionally supported by a substrate 1010. The slab core structure 1008 includes a few-mode waveguide supporting at least first, second, and third lateral modes of propagation having different degrees of confinement to the slab core structure 1008. First 1021 and second 1022 diffractive reflectors are coupled to the slab core structure 1008 proximate opposed first 1031 and second 1032 edges of the waveguide 1006, as shown. The first diffractive reflector 1021 is configured to convert at least a portion of a light beam 1005 from a first lateral optical mode 1011 of the few-mode waveguide to a second lateral optical mode 1012, in this example from the fundamental or $0^{th}$-order mode to a higher-order mode of the few-mode waveguide, upon reflection from the first diffractive reflector 1021. The second diffractive reflector 1022 is configured to convert at least a portion of the light beam 1005 from the second mode 1012 to a third lateral optical mode 1013, that is, to another higher-order mode of the few-mode waveguide, upon reflection from the second diffractive reflector 1022. The term "diffractive reflector" used throughput this application may include, for example, a Bragg grating, a metasurface structure, a sub-wavelength grating, a photonic crystal (PhC), a PhC cavity, etc. In some embodiments, diffractive reflectors may be replaced and/or complemented with diffractive intermodal couplers that couple light into a different lateral mode of propagation in transmission, not reflection. Such intermodal couplers may be shaped to have optical power and/or aberration correction capability, i.e. to focus or defocus light, due to different lateral modes having different effective refractive index.

An out-coupling region 1014 is provided over the slab core structure 1008 between the first 1021 and second 1022 diffractive reflectors, for out-coupling of light propagated in the slab core structure 1008. The first 1021 and second 1022 diffractive reflectors may be curved in XY plane to have optical power in XY plane, i.e. in the plane of the waveguide 1006, for collimation of the light beam 1005 received at the input port 1004 of the waveguide 1006 and out-coupled at the out-coupling region 1014 of the waveguide 1006. Coaxial orientation of the first 1021 and second 1022 curved diffractive reflectors may facilitate reduction of optical aberrations.

In operation, the light beam 1005 is coupled at the input port 1004. The light beam 1005 propagates in the first lateral mode 1011, i.e. the fundamental mode. The light beam 1005 propagates in the first lateral mode 1011 through the second diffractive reflector 1022 without reflection, since the second diffractive reflector 1022 only reflects light in the second 1012 and third 1013 optical modes. The light beam 1005 reflects from the first diffractive reflector 1021, where at least a portion of the light beam 1005 is converted from the first lateral mode 1011 into a second lateral mode 1012, such as a higher-order lateral mode of propagation in the few-mode waveguide, for example, first-order mode. The light beam 1005 in the second optical mode 1012 propagates back past the out-coupling region 1014 towards the second diffractive reflector 1022. The light beam 1005 reflects from the second diffractive reflector 1022, where at least a portion of the light beam 1005 is converted from the second lateral mode 1012 into the third lateral mode 1013, which is in this case a higher-order lateral mode of propagation less confined than the second lateral mode 1012, for example, second-order mode. Then, the light beam 1005 propagates back to the out-coupling area 1014. Since the third optical mode 1013 is less confined, or in other words, is broader laterally, i.e. in Z-direction in FIG. 10 than the second (first-order) optical mode 1012 or the first ($0^{th}$-order) optical mode 1011, the third optical mode 1013 gets out-coupled at the out-coupling region 1014 much more efficiently than the second (first-order) optical mode 1012 or first ($0^{th}$-order) mode 1011. The portion 925 of the light beam 1005 is out-coupled at the out-coupling region 1014. It is further noted that the out-coupling region 1014 doesn't have to be in between the first 1021 and second 1022 diffractive reflectors, and may be disposed e.g. to the right from the first diffractive reflector 1021. After reflecting from the second diffractive reflector 1022, the light beam 905 can freely pass through the first diffractive reflector 1021, since it is in a different mode.

The grating pitch $P_1$ of the first diffractive reflector 1021 and the grating pitch $P_2$ of the second diffractive reflector 1022 may be selected in accordance with the following formulas:

$$P_1 = \lambda/(n^1_{eff} + n^2_{eff}) \quad (1)$$

$$P_2 = \lambda/(n^2_{eff} + n^3_{eff}) \quad (2)$$

where $\lambda$ is a wavelength of the light beam, $n^1_{eff}$ is an effective refractive index for the first optical mode 1011, and $n^2_{eff}$ is an effective refractive index for the second optical mode 1012, and $n^3_{eff}$ is an effective refractive index for the third optical mode 1013.

It follows from Eqs. (1) and (2) that the optical performance of the waveguide 1006 is somewhat wavelength-dependent. For example, in a 2 micrometers thick silica waveguide with a 2% refractive index core, the mode refractive indices are: $n^1_{eff}$=1.487091, $n^2_{eff}$=1.477267, and $n^1_{eff}$=1.463484. For the light beam at the wavelength $\lambda$ of 520 nm, the grating pitch $P_1$ is 176.83 nm, and the grating pitch $P_2$ is 175.42 nm. The full spectral bandwidth $\Delta\lambda/\lambda$ may be calculated as follows:

$$\Delta\lambda/\lambda \approx 2(P_1 - P_2)/(P_1 + P_2) \quad (3)$$

With the above parameters entered into Eq. (3), $\Delta\lambda/\lambda$ is 4.2 nm.

Figure 11:
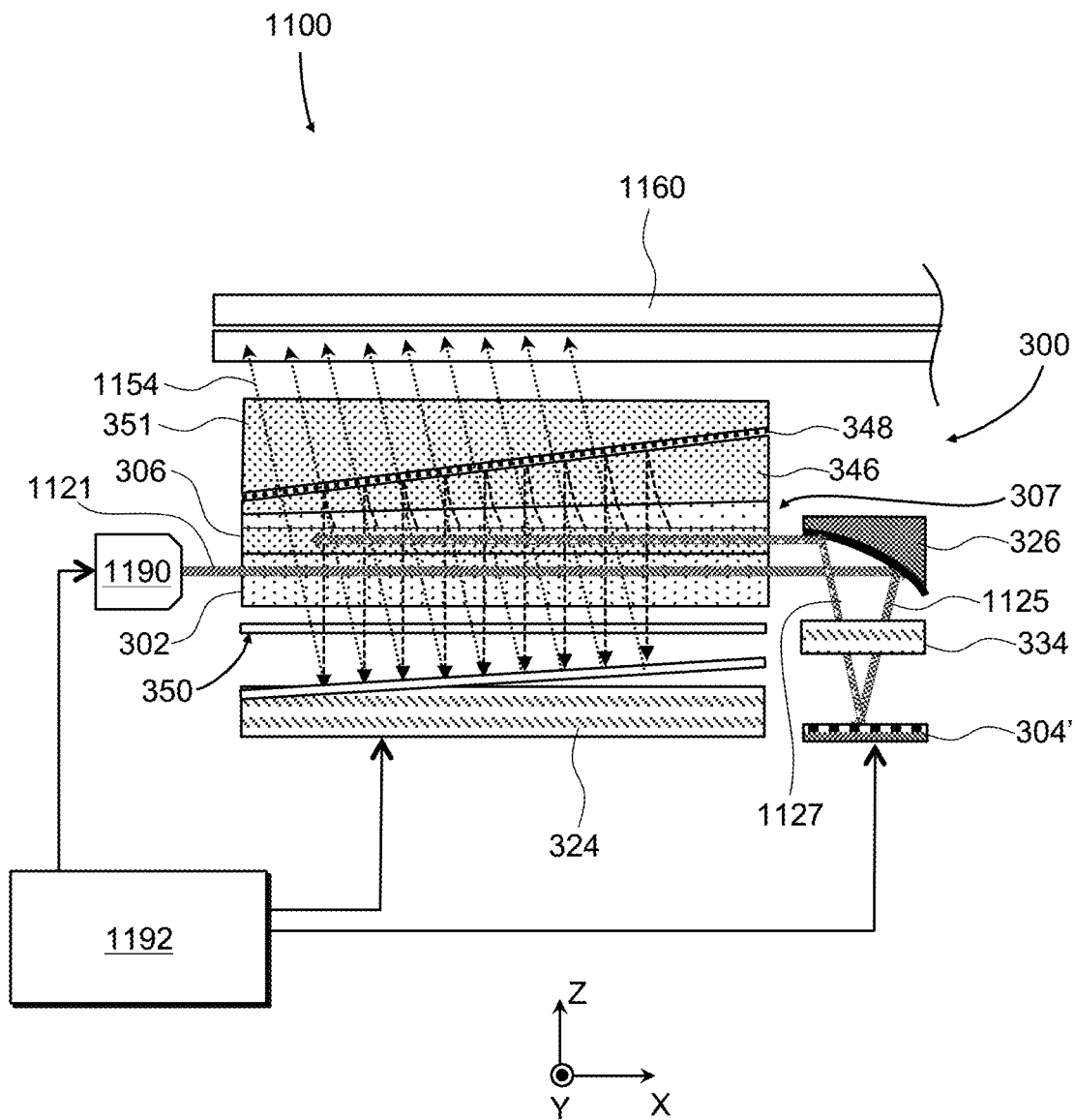
FIG. 11 is a side cross-sectional view of a display device incorporating a projector of this disclosure.

Turning to FIG. 11, an example display device 1100 of this disclosure includes the projector 300 of FIG. 3 coupled to a light source 1190, e.g. a semiconductor light source such as a LED, SLED, LD, etc. The light source 1190 may include several emitters, e.g. R, G, and B channel emitters as explained above, or even several emitters for a single color channel. The display device 1100 of FIG. 11 may further include a controller 1192 operably coupled to the light source 1190, the tiltable reflector 324, and the reflective spatial modulator 304', for controlling these devices in a coordinated manner so as to display an image to a user. A pupil-replicating lightguide assembly 1160 may be disposed and configured to receive and propagate the fan of light beams redirected by the tiltable reflector 324, and to out-couple portions of the received fan of light beams in a direction of an eyebox of the display device 1100.

In operation, the light source 1190 emits at least one light beam, e.g. a light beam 1121. The illumination waveguide layer 302 of the waveguide structure 307 receives and expands the light beam 1121 in a plane of the illumination waveguide 302, i.e. in XY plane, to produce an expanded light beam 1125. The reflective spatial modulator 304', or any other type of spatial modulator such as an array of Mach-Zehnder (MZ) interferometers, for example, receives the expanded light beam 1125 after optionally being refocused by the curved reflector 326 and color-separated by the wavelength dispersing element 334, spatially modulates the expanded light beam 1125 to provide a line of light points. The collimation waveguide layer 306 of the waveguide structure 307 receives and collimates light 1127 of the light points to obtain a fan of collimated light beams 1154, which is evanescently out-coupled from the collimation layer 306 and is directed by the reflective polarizer 348 to the tiltable reflector 324. The tiltable reflector 324, e.g. a MEMS reflector tiltable about a single axis parallel to Y axis in FIG. 11, receives and redirects the fan of light beams 1154 in a plane non-parallel to a plane of the fan of collimated light beams 1154, e.g. in a perpendicular plane. The QWP 350 changes the polarization of the fan of light beams 1154 to an orthogonal polarization upon double-pass propagation of the fan of light beams 1154 through the QWP 350, which causes the fan of light beams 1154 to propagate through the reflective polarizer 348 towards the pupil-replicating lightguide assembly 1160 and become guided by the pupil-replicating lightguide assembly 1160.

Figure 12:
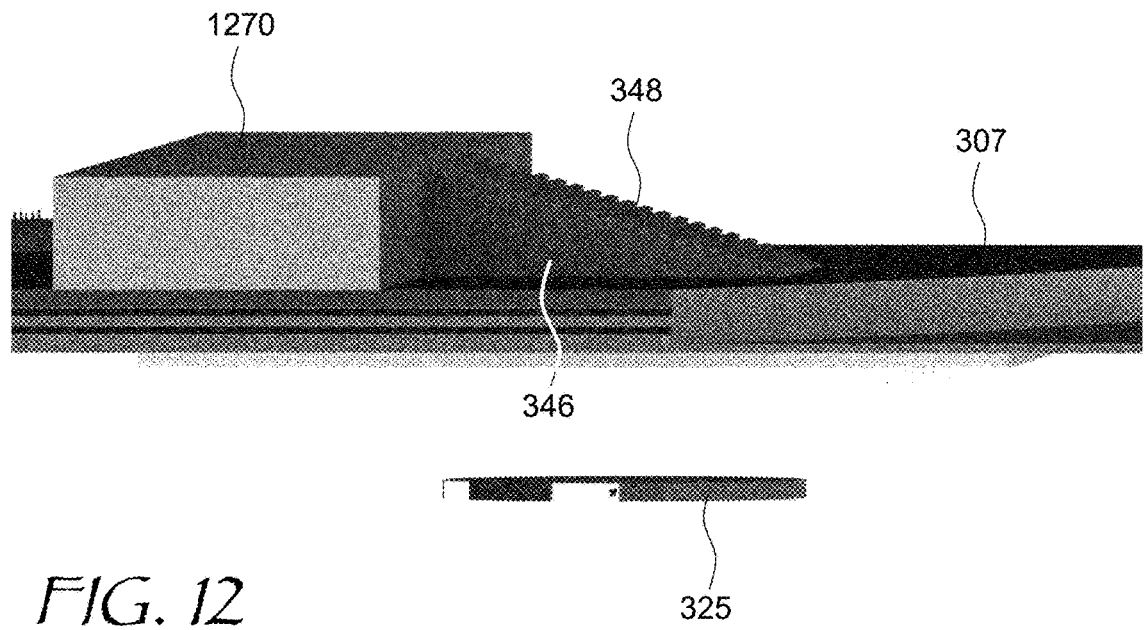
FIG. 12 is a three-dimensional view of a tiltable MEMS reflector of the display device of FIG. 11.
Figure 13:
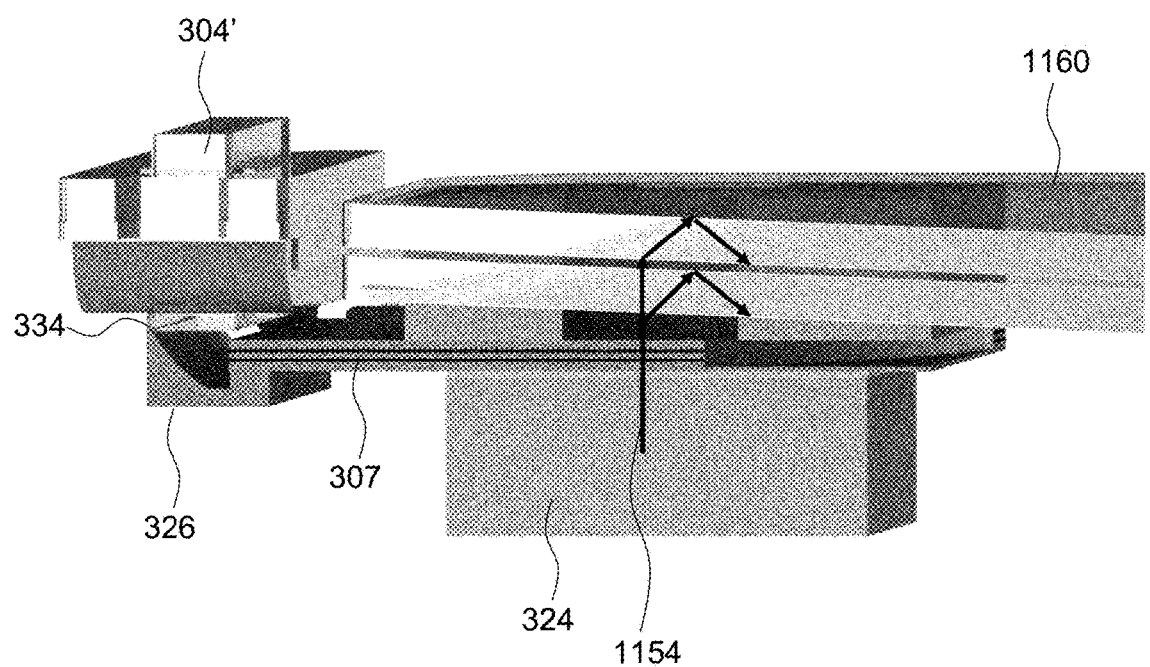
FIG. 13 is a three-dimensional view of the display device of FIG. 11 showing light propagation from the tiltable reflector to a pupil-replicating lightguide.

Relative disposition of the tiltable reflector 324, the waveguide structure 307, and the polarization-selective reflector 348 is further illustrated in FIGS. 12 and 13. Referring first to FIG. 12, the waveguide structure 307 and a side support 1270 together support the prismatic evanescent out-coupler 346. The polarization-selective reflector 348, in this case a wiregrid polarizer, is supported by the prismatic evanescent out-coupler 346 and the waveguide structure 307. The matching prism 351 is omitted from FIG. 12 for clarity. Only a tiltable mirror element 325 of the tiltable reflector 324 is shown in FIG. 12, to illustrate the distance between the tiltable mirror element 325 and the waveguide structure 307. Turning to FIG. 13, the pupil-replicating lightguide assembly 1160 may be supported by the side support 1270. The curved reflector 326, e.g. a cylindrical off-axis reflector, is supported by the waveguide structure 307. The wavelength dispersing element 334 and the reflective spatial modulator 304' are supported by the curved reflector 326. In operation, the output fan of collimated light beams 1154 is coupled into the pupil-replicating lightguide assembly 1160, as shown.

Figure 14:
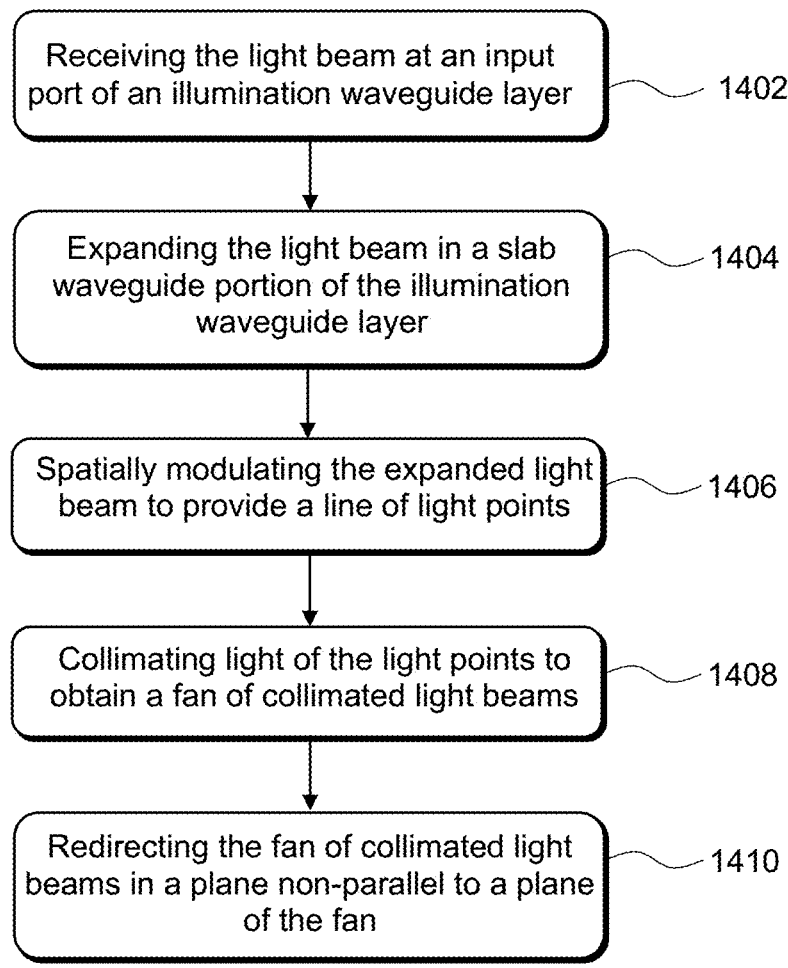
FIG. 14 is a flow chart of a method for projecting a light beam.

Referring now to FIG. 14 with further reference to FIGS. 1A and 1B, a method 1400 for projecting a light beam, e.g. the light beam 121 of FIGS. 1A and 1B, includes receiving (FIG. 14; 1402) the light beam 121 at an input port of an illumination waveguide layer, e.g. the input port 111 of the illumination waveguide layer 102. The light beam 121 is expanded (1404) in the slab waveguide portion 114 of the illumination waveguide layer 102. The expanded light beam is spatially modulated (1406) to provide the line of light points 118. The light of the light points 118 is then collimated (1408) to obtain a fan of collimated light beams 127 at the exit pupil 122. Each collimated light beam 127 of the fan has an angle corresponding to a coordinate of the corresponding light point 118 of the line of light points 118. The fan of collimated light beams may be optionally redirected (1410) in a plane non-parallel to a plane of the fan using the tiltable reflector 124 placed at the exit pupil.

Figure 15:
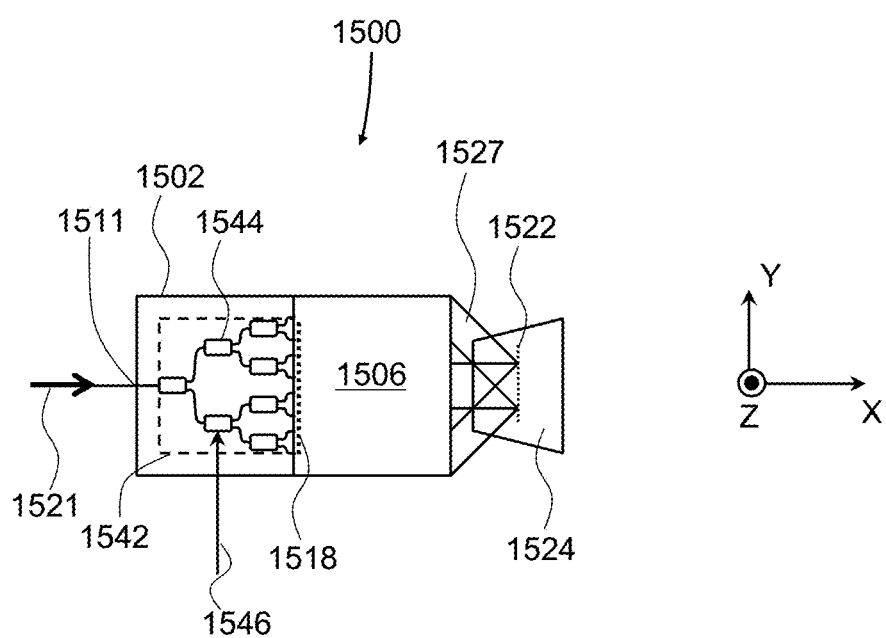
FIG. 15 is a plan schematic view of a waveguide projector of this disclosure.

Referring to FIG. 15, a waveguide projector 1500 includes an input port 1511 for receiving a first light beam 1521, a linear waveguide portion 1502 including an array 1542 of tunable Mach-Zehnder interferometers (MZIs) 1544 coupled to the input port 1511 and configured for redistributing optical power of the first light beam 1521 between light points of a line 1518 of light points in response to control signals 1546 applied to the MZIs 1544 of the array 1542. The waveguide projector 1500 further includes a slab waveguide portion 1506 coupled to the array 1542 of MZIs 1544 and configured for receiving and collimating light of the light points 1518 to obtain a fan of collimated light beams 1527 at an exit pupil 1522. Each collimated light beam 1527 of the fan has an angle corresponding to a coordinate of the corresponding light point of the line 1518 of light points.

The operation of the slab waveguide portion 1506 is similar to the operation of the collimation waveguide layer 106 of FIGS. 1A and 1B, or any other collimation waveguide layer disclosed herein. For example, the slab waveguide portion 1506 may include a pair of coaxial curved reflectors such as the reflectors 821 and 822 of FIG. 8A, and/or a few-mode waveguide similar to the few-mode waveguide 1008 of the collimation waveguide layer 1006 of FIG. 10. The slab waveguide portion 1506 may also include an evanescent out-coupler for out-coupling the fan of collimated light beams 1527 from the slab waveguide portion 1506, similar to the evanescent out-coupler 346 of FIG. 3A, and may include a polarization-selective out-coupler similar to the polarization-selective out-coupler 349 of FIG. 3B. The waveguide projector 1500 may further include a tiltable reflector 1524 at the exit pupil 1522. The tiltable reflector 1524, e.g. a MEMS tiltable reflector, may be configured to receive and redirect the fan of light beams 1527 in a plane non-parallel to a plane of the fan of collimated light beams, i.e. non-parallel to XY plane in FIG. 15.

Figure 16:
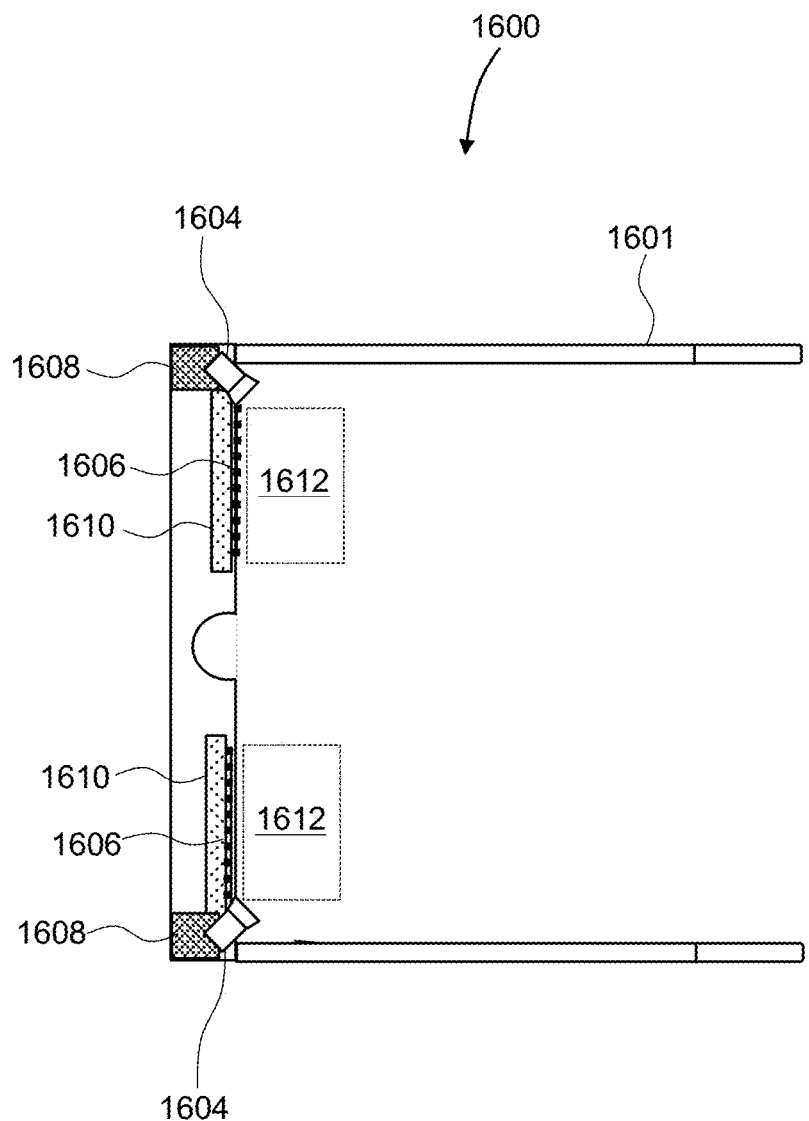
FIG. 16 is a view of a near-eye display of this disclosure having a form factor of a pair of eyeglasses.

Turning to FIG. 16, a near-eye display 1600 includes a frame 1601 having a form factor of a pair of eyeglasses. The frame 1601 supports, for each eye: a projector 1608 including any of the projectors described herein, a pupil-replicating waveguide 1610 optically coupled to the projector 1608, an eye-tracking camera 1604, and a plurality of illuminators 1606. The illuminators 1606 may be supported by the pupil-replicating waveguide 1610 for illuminating an eyebox 1612. The projector 1608 provides a fan of light beams carrying an image in angular domain to be projected into a user's eye. The pupil-replicating waveguide 1610 receives the fan of light beams and provides multiple laterally offset parallel copies of each beam of the fan of light beams, thereby extending the projected image over the eyebox 1612. For augmented reality (AR) applications, the pupil-replicating waveguide 1610 can be transparent or translucent to enable the user to view the outside world together with the images projected into each eye and superimposed with the outside world view. The images projected into each eye may include objects disposed with a simulated parallax, so as to appear immersed into the real world view.

The purpose of the eye-tracking cameras 1604 is to determine position and/or orientation of both eyes of the user. Once the position and orientation of the user's eyes are known, a gaze convergence distance and direction may be determined. The imagery displayed by the projectors 1608 may be adjusted dynamically to account for the user's gaze, for a better fidelity of immersion of the user into the displayed augmented reality scenery, and/or to provide specific functions of interaction with the augmented reality. In operation, the illuminators 1606 illuminate the eyes at the corresponding eyeboxes 1612, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1612.

Following are examples of a display device that can be built using waveguide projectors considered herein.

Example 1. A display device comprising:
a semiconductor light source for emitting a light beam;
a waveguide structure comprising an illumination waveguide layer optically coupled to the semiconductor light source for receiving and expanding the light beam in a plane of the illumination waveguide;
a spatial modulator optically coupled to the illumination waveguide layer for spatially modulating the expanded light beam to provide a line of light points,
the waveguide structure further comprising a collimation waveguide layer for receiving and collimating light of the light points to obtain a fan of collimated light beams at an exit pupil of the collimation waveguide layer; and
a tiltable reflector at the exit pupil, wherein the tiltable reflector is configured to receive and redirect the fan of light beams in a plane non-parallel to a plane of the fan of collimated light beams.

Example 2. The display device of example 1, further comprising a pupil-replicating lightguide assembly disposed and configured to receive and propagate therein the fan of light beams redirected by the tiltable reflector, and to out-couple portions of the received fan of light beams in a direction of an eyebox of the display device.

Example 3. The display device of example 1, wherein:
the spatial modulator comprises an array of tiltable mircomirrors, the display device further comprises a coupling element for coupling the expanded first light beam outputted from the illumination waveguide layer to the array of tiltable micromirrors, and for coupling the expanded first light beam reflected from the array of tiltable micromirrors into the collimation waveguide layer, wherein the array of tiltable micromirrors is operable to selectively tilt micromirrors of the array to provide spatial modulation of amplitude of the expanded light beam.

Example 4. The display device of example 3, wherein the tiltable reflector comprises a microelectromechanical system (MEMS) reflector tiltable about a single axis.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A projector comprising:
   an illumination waveguide layer comprising a first input port for receiving a first light beam, a slab waveguide portion optically coupled to the first input port for expanding the first light beam, and an output surface for outputting the first light beam expanded in the slab waveguide portion;
   a spatial modulator optically coupled to the output surface of the illumination waveguide layer for spatially modulating the expanded first light beam to provide a line of light points; and
   a collimation waveguide layer optically coupled to the spatial modulator for receiving and collimating light of the light points to obtain a fan of collimated light beams at an exit pupil of the collimation waveguide layer, each collimated light beam of the fan having an angle corresponding to a coordinate of the corresponding light point of the line.

2. The projector of claim 1, wherein the slab waveguide portion of the illumination waveguide layer comprises a curved reflector for collimating the first light beam in a plane of the slab waveguide portion.

3. The projector of claim 1, wherein the illumination waveguide layer comprises:
   a first linear waveguide optically coupling the first input port to the slab waveguide portion;
   second and third input ports for receiving second and third light beams respectively; and
   second and third linear waveguides optically coupling the second and third input ports, respectively, to the slab waveguide portion, wherein the slab waveguide portion is configured for expanding the second and third light beams received at the second and third input ports, respectively, and wherein the first, second, and third linear waveguides are disposed closer together proximate the slab waveguide portion than proximate the first, second, and third input ports.

4. The projector of claim 3, further comprising:
   first, second, and third semiconductor light sources for emitting the first, second, and third light beams, respectively; and
   first, second, and third couplers for coupling the first, second, and third semiconductor light sources to the first, second, and third input ports of the illumination waveguide layer.

5. The projector of claim 1, wherein the spatial modulator comprises an array of reflective pixels of variable reflectivity, and wherein the projector further comprises a coupling element for coupling the expanded first light beam outputted from the illumination waveguide layer to the array of reflective pixels, and for coupling the expanded first light beam reflected from the array of reflective pixels into the collimation waveguide layer.

6. The projector of claim 5, wherein the coupling element comprises a holographic optical element configured to direct different wavelength components of the expanded first light beam onto different reflective pixels of the array of reflective pixels.

7. The projector of claim 5, wherein the coupling element comprises a cylindrical optical element for collimating the expanded first light beam in a plane perpendicular to a plane of the slab waveguide portion.

8. The projector of claim 1, wherein the collimation waveguide layer comprises a slab waveguide portion comprising two coaxial curved reflectors.

9. The projector of claim 8, wherein the slab waveguide portion of the collimation waveguide layer comprises a few-mode waveguide.

10. The projector of claim 8, wherein the slab waveguide portion of the collimation waveguide layer comprises an evanescent out-coupler for out-coupling the fan of collimated light beams from the collimation waveguide layer.

11. The projector of claim 1, wherein the illumination and collimation waveguide layers are parts of a same waveguide structure.

12. The projector of claim 1, further comprising a tiltable reflector at the exit pupil of the collimation waveguide, wherein the tiltable reflector is configured to receive and redirect the fan of collimated light beams in a plane non-parallel to a plane of the fan of collimated light beams.

13. The projector of claim 12, wherein the spatial modulator comprises an array of tiltable micromirrors, and wherein the projector further comprises a coupling element for coupling the expanded first light beam outputted from the illumination waveguide layer to the array of tiltable micromirrors, and for coupling the expanded first light beam reflected from the array of tiltable micromirrors into the collimation waveguide layer, wherein the array of tiltable micromirrors is operable to selectively tilt micromirrors of the array to provide spatial modulation of amplitude of the expanded first light beam.

14. The projector of claim 1, wherein the illumination waveguide layer and the collimation waveguide layer comprise a same waveguide layer.

15. A waveguide projector comprising:
an input port for receiving a first light beam;
an array of Mach-Zehnder interferometers (MZIs) coupled to the input port and configured for redistributing optical power of the first light beam between light points of a line of light points in response to control signals applied to MZIs of the array; and
a slab waveguide portion coupled to the array of MZIs and configured for receiving and collimating light of the light points to obtain a fan of collimated light beams at an exit pupil, each collimated light beam of the fan having an angle corresponding to a coordinate of the corresponding light point of the line of light points.

16. The waveguide projector of claim 15, wherein the slab waveguide portion comprises at least one of: a pair of coaxial curved reflectors; or a few-mode waveguide.

17. The waveguide projector of claim 15, wherein the slab waveguide portion comprises an evanescent out-coupler for out-coupling the fan of collimated light beams from the slab waveguide portion.

18. The waveguide projector of claim 15, further comprising a tiltable reflector at the exit pupil, wherein the tiltable reflector is configured to receive and redirect the fan of light beams in a plane non-parallel to a plane of the fan of collimated light beams.

19. A method for projecting a light beam, the method comprising:
receiving the light beam at an input port of an illumination waveguide layer;
expanding the light beam in a slab waveguide portion of the illumination waveguide layer;
spatially modulating the expanded light beam to provide a line of light points; and
collimating light of the light points to obtain a fan of collimated light beams at an exit pupil, each collimated light beam of the fan having an angle corresponding to a coordinate of the corresponding light point of the line.

20. The method of claim 19, further comprising redirecting the fan of collimated light beams in a plane non-parallel to a plane of the fan, using a tiltable reflector at the exit pupil.

* * * * *